United States Patent
Bonavides

(10) Patent No.: US 9,828,851 B1
(45) Date of Patent: Nov. 28, 2017

(54) SUBSURFACE DATA TRANSFER USING WELL FLUIDS

(71) Applicant: Saudi Arabian Oil Company, Dhahran (SA)

(72) Inventor: Clovis Satyro Bonavides, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/209,493

(22) Filed: Jul. 13, 2016

(51) Int. Cl.
*E21B 47/00* (2012.01)
*E21B 47/01* (2012.01)
*E21B 47/12* (2012.01)
*G01V 3/18* (2006.01)
*G01V 3/20* (2006.01)
*G01V 3/22* (2006.01)
*G01V 3/24* (2006.01)

(52) U.S. Cl.
CPC ............ *E21B 47/124* (2013.01); *E21B 47/00* (2013.01); *E21B 47/01* (2013.01); *E21B 47/12* (2013.01); *E21B 47/122* (2013.01); *G01V 3/18* (2013.01); *G01V 3/20* (2013.01); *G01V 3/22* (2013.01); *G01V 3/24* (2013.01)

(58) Field of Classification Search
CPC .......... E21B 21/08; E21B 47/00; E21B 47/01; E21B 47/12; E21B 47/122; E21B 47/124; G01V 11/002; G01V 3/18; G01V 3/20; G01V 3/22; G01V 3/24
See application file for complete search history.

(56) References Cited

U.S. PATENT DOCUMENTS

| 6,241,028 B1 | 6/2001 | Bijleveld et al. |
| 6,324,904 B1 | 12/2001 | Ishikawa et al. |
| 6,443,228 B1 * | 9/2002 | Aronstam ............... E21B 47/12 166/250.11 |

(Continued)

FOREIGN PATENT DOCUMENTS

| EP | 1584783 | 10/2005 |
| GB | 1549307 | 7/1979 |

(Continued)

OTHER PUBLICATIONS

Iqbal et al., "In Situ Micro-Cantilever Tests to Study Fracture Properties of NiAl Single Crystals," Dec. 2011, Abstract, 1 page.
Liu et al., "Dimension Effect on Mechanical Behavior of Silicon Micro-Cantilever Beams," Jan. 2008, 11 pages.
Liu et al., "Micro-Cantilever Testing to Evaluate the Mechanical Properties of Thermal Barrier Coatings," Jan. 2012, 7 pages.

(Continued)

*Primary Examiner* — Hai Phan
*Assistant Examiner* — Franklin Balseca
(74) *Attorney, Agent, or Firm* — Fish & Richardson P.C.

(57) ABSTRACT

Some examples of transferring data from a subsurface of a wellbore using well fluids include positioning multiple data recording devices at a subsurface location in a wellbore. When a well fluid flows through the wellbore past the subsurface location to a surface, each data recording device is configured to receive and store data describing subsurface wellbore conditions at or near the subsurface location. At least a portion of the data describing the subsurface wellbore conditions are stored on each data recording device. Each data recording device is released from the subsurface location. The well fluid flows each data recording device to the surface.

18 Claims, 29 Drawing Sheets

(56) References Cited

U.S. PATENT DOCUMENTS

| | | | |
|---|---|---|---|
| 6,915,848 B2 * | 7/2005 | Thomeer | E21B 47/01 |
| | | | 166/250.11 |
| 6,971,265 B1 | 12/2005 | Sheppard et al. | |
| 7,455,108 B2 * | 11/2008 | Jenkins | E21B 47/12 |
| | | | 166/250.01 |
| 2004/0257241 A1 | 12/2004 | Menger | |
| 2012/0234534 A1 * | 9/2012 | Hughes | E21B 33/05 |
| | | | 166/255.1 |
| 2013/0118733 A1 | 5/2013 | Kumar | |
| 2013/0261971 A1 | 10/2013 | Ramirez et al. | |
| 2015/0068771 A1 | 3/2015 | Richards et al. | |

FOREIGN PATENT DOCUMENTS

| | | |
|---|---|---|
| GB | 2396170 B | 6/2007 |
| WO | WO 01/04460 A1 | 1/2001 |

OTHER PUBLICATIONS

Wilson et al., "Fracture Testing of Bulk Silicon Microcantilever Beams Subjected to a Side Load," Journal of Microelectromechanical Systems, vol. 5, No. 3, Sep. 1996, Abstract, 1 page.
Wurster et al., "Characterization of the Fracture Toughness of Micro-Sized Tungsten Single Crystal Notched Specimens," Feb. 2012, Abstract, 1 page.
International Search Report and Written Opinion issued in International Application No. PCT/US2017/038673 dated Sep. 1, 2017; 12 pages.

* cited by examiner

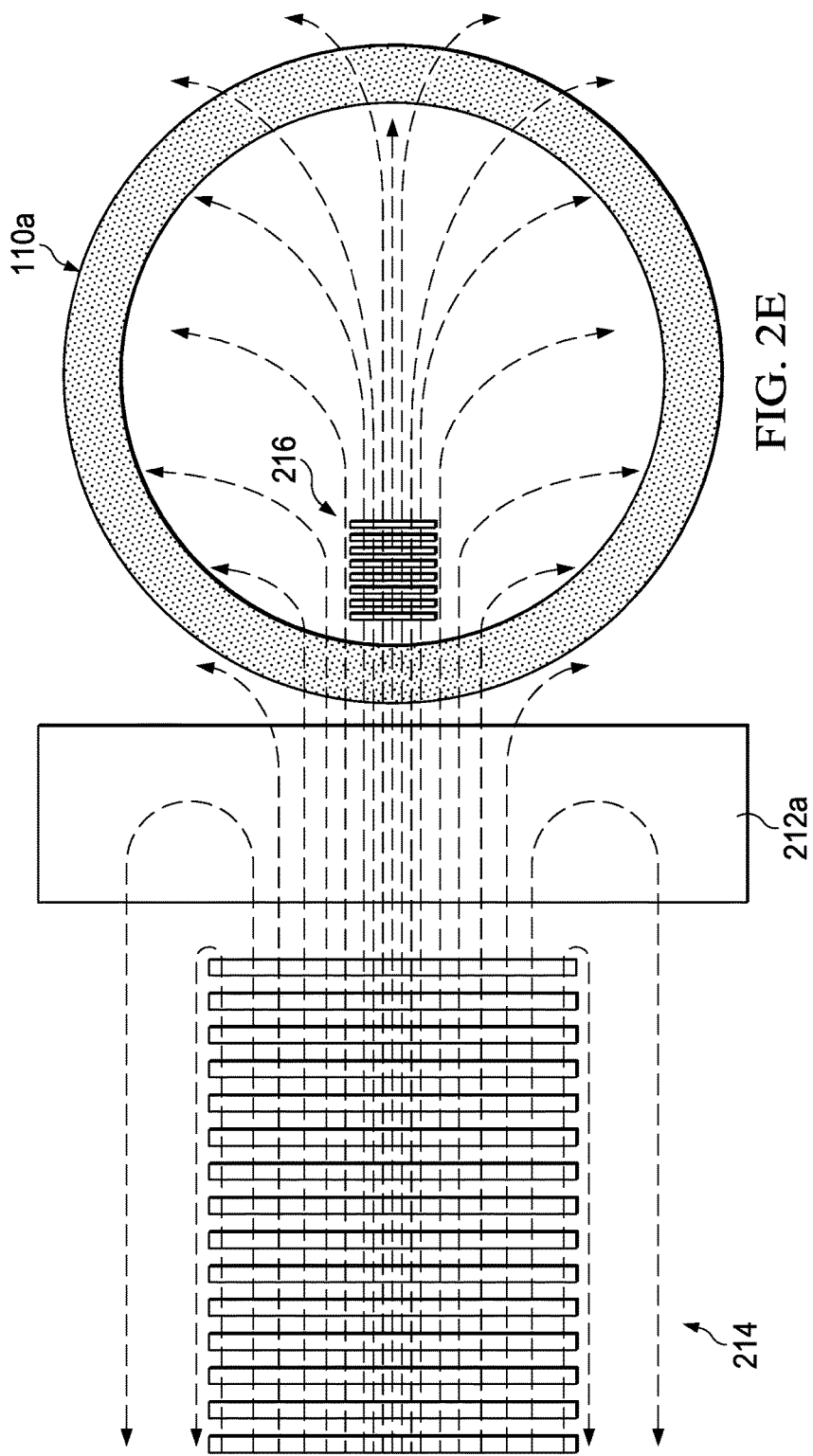

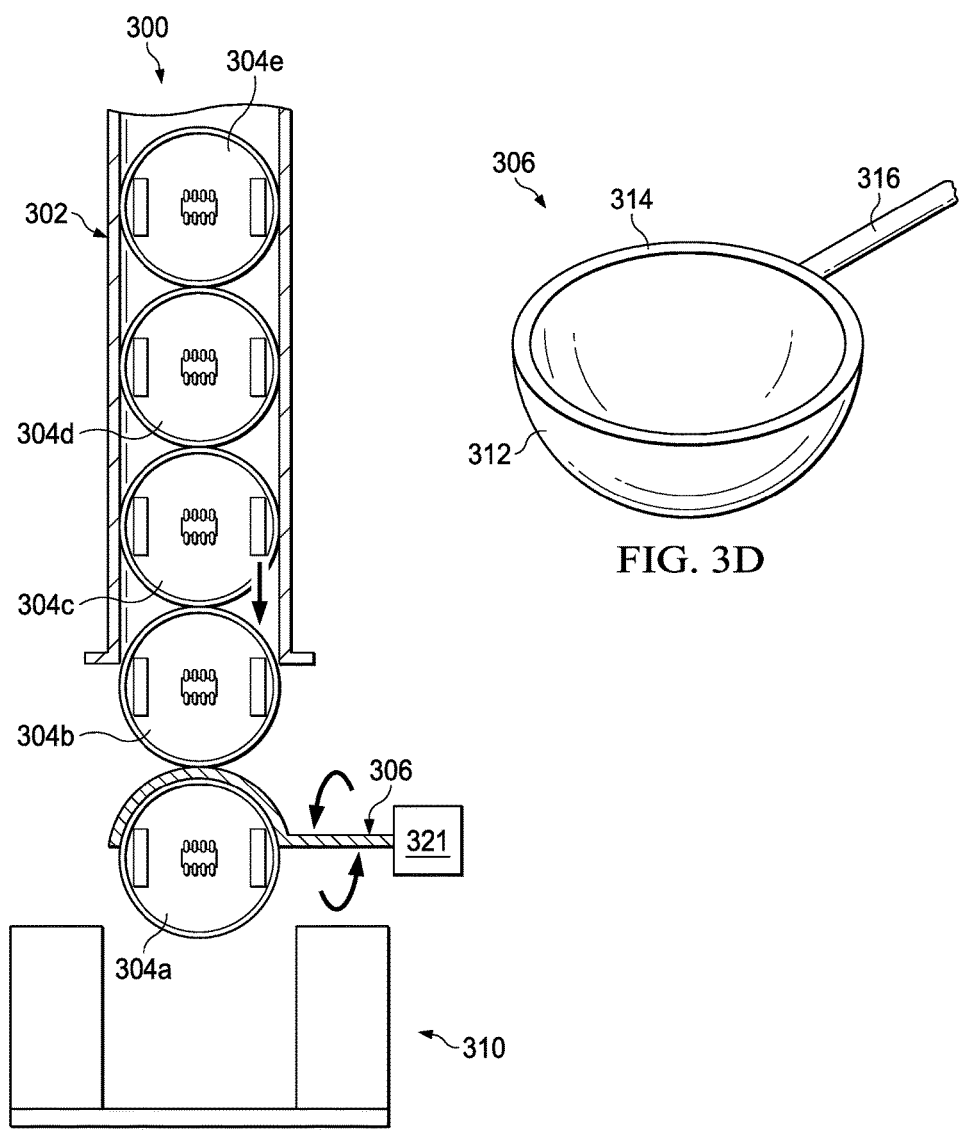

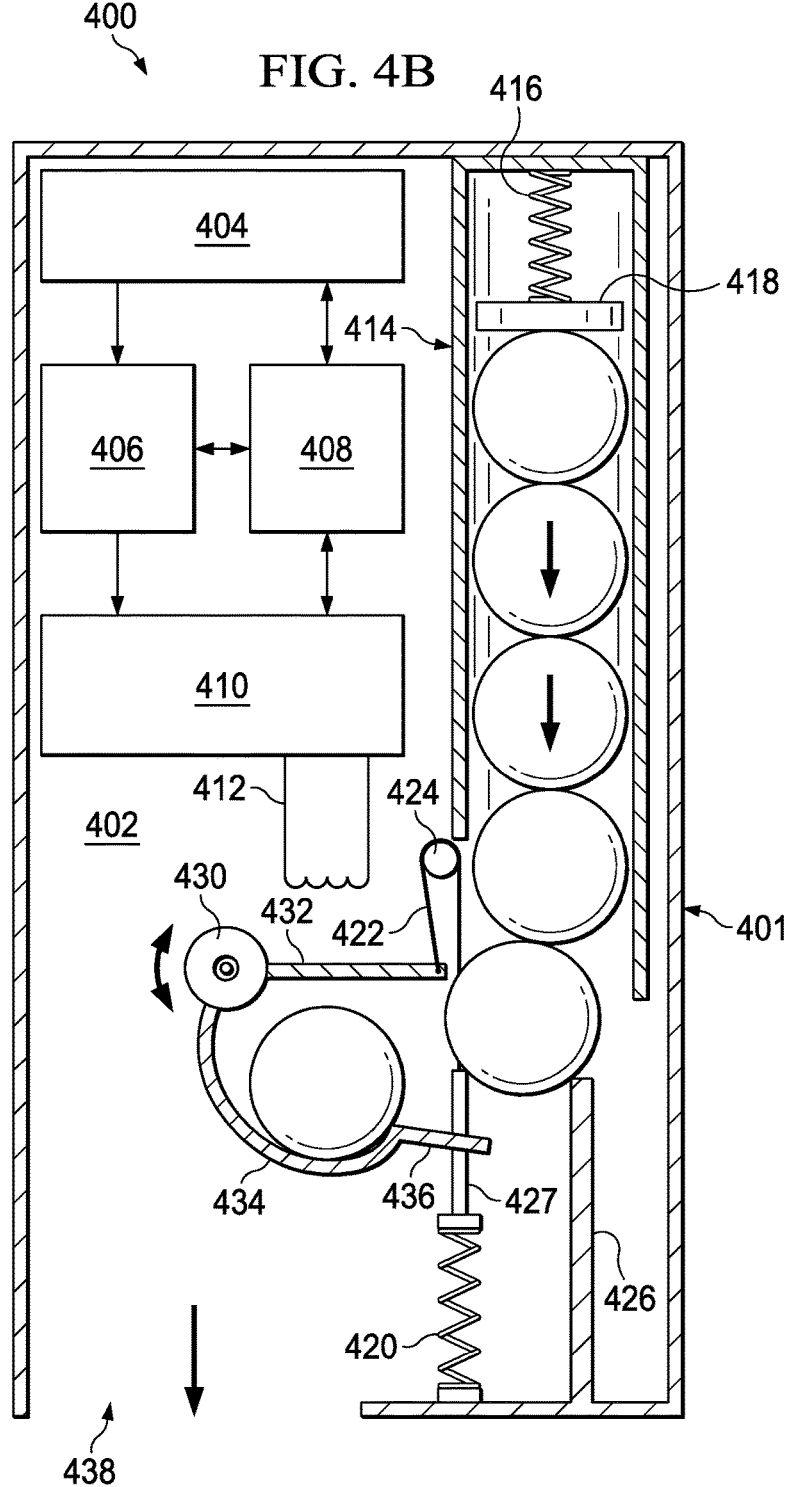

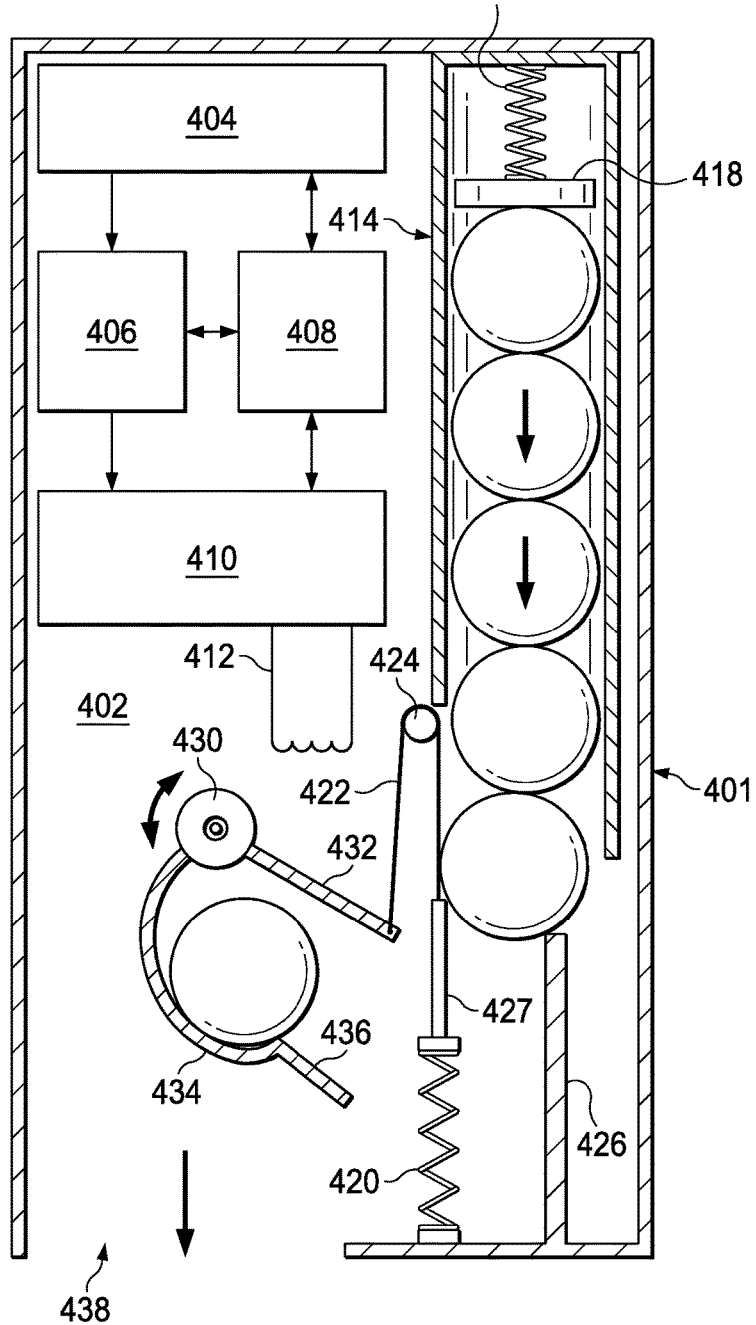

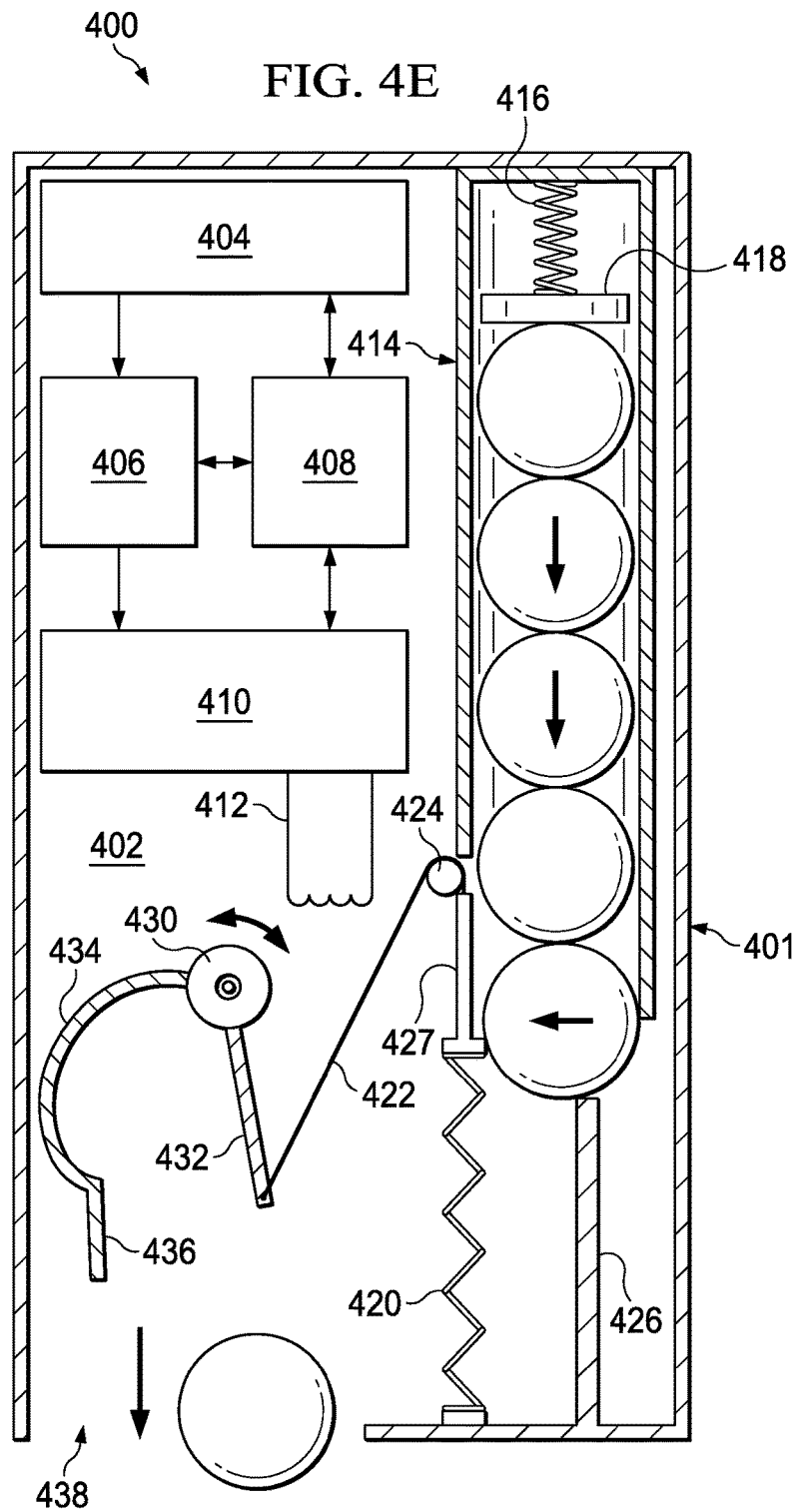

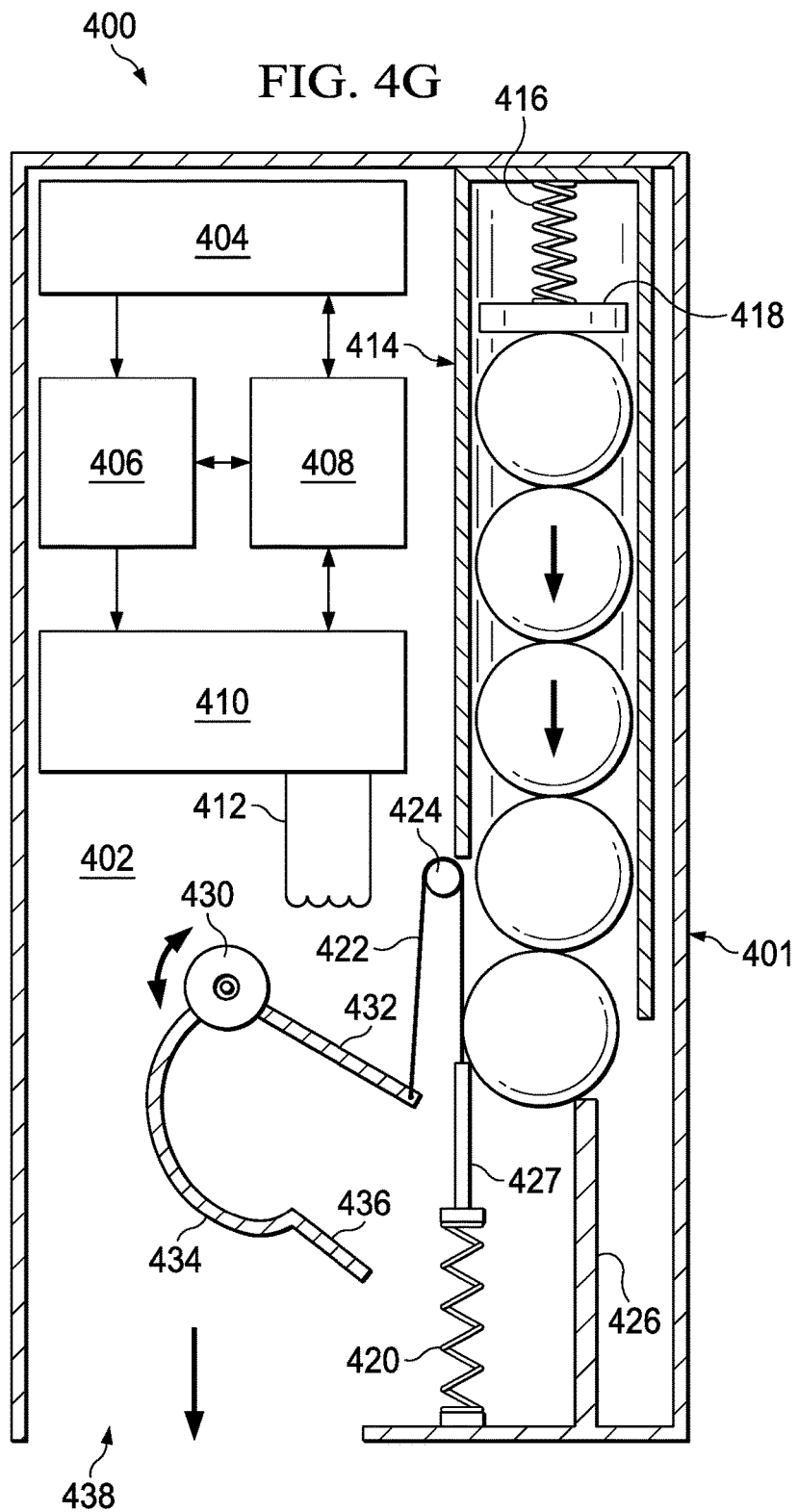

US 9,828,851 B1

SUBSURFACE DATA TRANSFER USING WELL FLUIDS

TECHNICAL FIELD

This disclosure relates to transferring data obtained subsurface, for example, from within a wellbore in a hydrocarbon reservoir, to the surface, for example, using well fluids as data carriers.

BACKGROUND

Wellbore operations can include, for example, drilling, production, or other operations. Information obtained from below the surface, for example, within the wellbore, in geological formations surrounding the wellbore, or other locations below the surface are used to control the wellbore operations. Some techniques to obtain the information include lowering a logging tool on a wireline into the wellbore. The logging tool is configured to acquire information, for example, fluid velocity, temperature, pressure, and transmit the acquired information to the surface. However, such logging tools may become entangled with subsurface equipment. Logging tools implemented without wire lines may be difficult to deploy to and retrieve from below the surface.

SUMMARY

This disclosure describes subsurface data transfer using well fluids, for example, by recording subsurface information on to memory chips and transferring the memory chips uphole using the well fluids.

Certain aspects of the subject matter disclosed in this Specification can be implemented as a method. Multiple data recording devices are positioned at a subsurface location in a wellbore. When a well fluid flows through the wellbore past the subsurface location to a surface, each data recording device is configured to receive and store data describing subsurface wellbore conditions at or near the subsurface location. At least a portion of the data describing the subsurface wellbore conditions are stored on each data recording device. Each data recording device is released from the subsurface location. The well fluids carry each data recording device to the surface.

This, and other aspects, can include one or more of the following features. Each data recording device can be encapsulated in a bead before positioning the multiple data recording devices at the subsurface location. The data recording device can be positioned between the two magnetic plates at substantially a center of the bead. The bead can be filled with bead filler material. The bead filler material can be encapsulated with a bead shell. Each bead includes an encapsulated data recording device. The multiple beads can be positioned in a bead feeder mechanism configured to dispense the beads. A programming device can be positioned in the bead feeder mechanism. The programming device is configured to store data on a data recording device encapsulated in a bead. The bead feeder mechanism and the programming device can be operated to store at least the portion of the data describing the subsurface wellbore conditions on each data recording device encapsulated in each bead. Each data recording device can be released from the subsurface location directly and without intervening components into the flow of the well fluid. Each data recording device can be released into a borehole dispenser configured to receive a bead from the bead feeder mechanism and to transfer the bead to the well fluid. The bead feeder mechanism can be hydraulically isolated from the well fluid using the borehole dispenser. The multiple data recording devices can be captured at the surface. At least the portion of the data describing the subsurface wellbore conditions can be retrieved from each data recording device.

Certain aspects of the subject matter described here can be implemented as a system. The system includes multiple data recording devices, each data recording device configured to receive and store data describing subsurface wellbore conditions at or near the subsurface location past which well fluid flows to a surface of the wellbore. The system includes multiple beads, each bead encapsulating a respective data recording device and configured to be stored at the subsurface location in the wellbore. The system includes a bead feeder mechanism configured to be positioned at the subsurface location. The bead feeder mechanism is configured to store the multiple beads and to dispense one bead at a time. The system includes a wireless programming device configured to be positioned at the subsurface location. The wireless programming device is configured to receive a bead of the multiple beads from the bead feeder mechanism, and to record at least a portion of the data describing the subsurface wellbore conditions onto a data recording device encapsulated in the bead. The bead feeder mechanism is configured to release the bead encapsulating the data recording device on which at least the portion of the data describing the subsurface wellbore conditions is stored into a flow of the well fluid towards the surface.

This, and other aspects, can include one or more of the following features. The system can include a borehole dispenser connected to the bead feeder mechanism. The borehole dispenser can be configured to receive the bead released by the bead feeder mechanism and to transfer the bead to the well fluid. The borehole dispenser can include an inlet chamber connected to an outlet of the bead feeder mechanism, an outlet chamber connected to the wellbore, and a piston configured to stroke between the inlet chamber and the outlet chamber. The piston can be configured to capture the bead released by the bead feeder mechanism at the inlet chamber, transport the bead from the inlet chamber to the outlet chamber and release the bead from the outlet chamber into the flow of the well fluid. The borehole dispenser can include a hydraulic fluid circuit connecting the piston to a low pressure reservoir and a high pressure reservoir through a solenoid valve, and control circuitry connected to the hydraulic fluid circuit. The control circuitry can be configured to operate the solenoid valve to stroke the piston between the inlet chamber and the outlet chamber. The borehole dispenser can include a switch configured to switch between an open circuit position and a closed circuit position in response to being out of and in contact, respectively, with the piston. The switch can be connected to the bead feeder mechanism, which is configured to release the bead in response to the switch being in the closed circuit position. Each data recording device can include a microchip. Each bead can include a bead shell, bead filler material substantially filling the bead shell, the microchip embedded in the bead filler material, and two magnetic plates positioned on either side of the microchip to assure proper alignment of the bead relative to the wireless data recording/reading system and embedded in the bead filler material. The wireless programming device can include a powering and recording coil configured to receive and transmit radio frequency waves to transmit and record data onto the microchip, a base, and two magnets arranged on the base to form a chamber to receive the bead. The powering and recording coil and the two magnets can be positioned on either side of the base. The bead feeder mechanism can include a feeder tube configured to store the multiple beads in a vertical stack. The feeder tube can include an outlet that is aligned with the wireless programming device to release the bead encapsulating the data recording device to the wireless programming device.

Certain aspects of the subject matter described here can be implemented as a method. Multiple microchips are encapsulated into respective multiple substantially spherical beads. To encapsulate a microchip into a respective bead, the bead is filled with bead filler material, the microchip is embedded within the bead filler material, two magnetic plates are embedded on either side of the microchip within the bead filler material, and the bead is sealed. The microchip is configured to record data. The multiple beads are positioned in a downhole apparatus that includes a bead feeder mechanism in which the multiple beads are stacked, a wireless programming device configured to record data onto the multiple microchips encapsulated in the multiple beads, and a borehole dispenser configured to receive a bead released by the bead feeder mechanism and release the bead outside the downhole apparatus. The downhole apparatus with the multiple beads is positioned at a subsurface location in a wellbore. A well fluid is flowing through the wellbore past the subsurface location to a surface. The wireless programming device is operated to record data describing the subsurface location in the wellbore onto the multiple microchips. The bead feeder mechanism is operated to release each bead encapsulating each microchip storing at least a portion of the recorded data into the borehole dispenser. The borehole dispenser is operated to release each bead into a flow of the well fluid flowing in the wellbore.

This, and other aspects, can include one or more of the following features. At the surface, the multiple beads can be captured. The data describing the subsurface wellbore conditions can be retrieved from the multiple microchips. The data describing the subsurface location can be received from one or more sensors disposed at or near the subsurface location. A wellbore equipment can be installed at or near the subsurface location. The data describing the subsurface location can include data describing operational parameters of the wellbore equipment operating at or near the subsurface location. The data describing the operational parameters can be received from the wellbore equipment.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 2E is a schematic diagram of a powering and recording coil writing data to a data recording device.

FIGS. 3A-3D are schematic diagrams showing an example of a first implementation of a bead feeder mechanism to position beads into the wireless programming device.

FIGS. 4A-4H are schematic diagrams showing an example of a second implementation of a bead feeder mechanism to position beads into the wireless programming device.

DETAILED DESCRIPTION

This disclosure relates to transferring data from subsurface assemblies by sending memory chips containing recorded information to the surface of the well using fluids flowing through the well as carriers. In some implementations, the memory chips are encased in a package called a bead. Subsurface information is recorded wirelessly onto the microchips in the beads. A bead, with wirelessly recorded subsurface information, is then released into the well fluid and carried uphole. The data recorded onto the microchips is then retrieved at the surface. Data recorded onto the microchips can include, for example, pressure, temperature, flow rate, flow speed (as a flow profile), fluid resistivity, fluid pH, fluid phase composition (such as percentage liquid, percentage gas), $H_2S$ content, equipment status information (such as battery voltage, vibration, wear-related data), any combination of them or other data.

In some implementations, a downhole apparatus configured to implement the techniques described here can include a bead feeder, a wireless programmer, and a downhole dispenser. As described below, the bead feeder can feed the beads containing the memory chip into a programming chamber in the wireless programmer. The wireless programmer can record the subsurface information to be read at the surface onto a microchip embedded inside the bead. It may also wirelessly read information stored in the bead. The downhole dispenser can release a bead onto which subsurface information has been recorded into the wellbore, for example, into the flow of well fluids flowing uphole. At the surface, a capturing apparatus can be implemented to capture the beads or to read out the beads as the beads travel or both.

Figure 1:
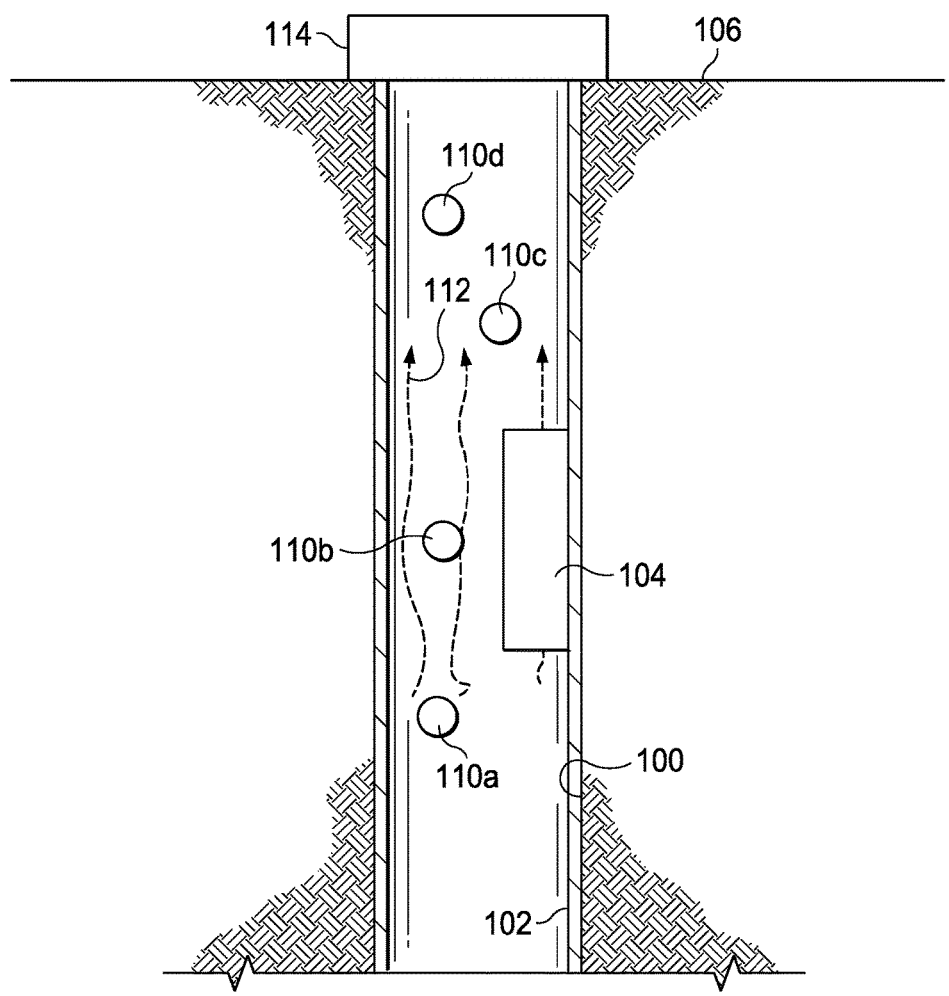
FIG. 1 is a schematic drawing showing an example of a downhole apparatus positioned in a wellbore.

FIG. 1 is a schematic drawing showing a downhole apparatus positioned in a wellbore 100. The wellbore 100 can be formed in a subterranean zone (for example, a geological formation, a portion of a formation, or portions of multiple formations). In some implementations, the wellbore 100 can include a casing 102. Alternatively, the wellbore 100 can be uncased. The downhole apparatus 104 can be positioned inside the wellbore 100, for example, at a subsurface location below the surface 106. The location of the downhole apparatus 104 below the surface 106 can be determined based on several factors. For example, the downhole apparatus 104 can be installed in a target reservoir, in cap rock, near a downhole equipment, or at any subsurface location about which information is desired. As described below, the downhole apparatus 104 includes multiple beads, each including a microchip (or other data recording device) on which wellbore information can be recorded. After recording wellbore information onto one or more microchips, the downhole apparatus 104 can be configured to release the beads in which the microchips are embedded, into the wellbore 100. Well fluids 112, for example, production fluids, flowing uphole towards the surface 106, can carry the beads (for example, a first bead 110a, a second bead 11b, a third bead 110c, a fourth bead 11d, and more or fewer beads) towards the surface 106. The capturing apparatus 114, for example, a sieve, a magnet or other capturing apparatus, can be positioned at the surface to capture and separate the beads from the well fluids 112.

In some implementations, more than one downhole apparatus can be positioned at different subsurface locations in the wellbore. The microchips embedded in the beads stored in different downhole apparatuses at different subsurface locations can store wellbore information about the different subsurface locations. In a multi-lateral well system, more than one downhole apparatus can be positioned in the mother bore, one or more lateral well, or combinations of them. The subsurface information gathered from each lateral well or from the motherbore, or both can be used to learn about the subsurface conditions in the geological formations in which the multi-lateral well system has been formed or about the fluid static or dynamic (production) parameters in the flowing well.

This disclosure is described in the context of a wellbore from which fluids are being produced. The techniques described in this disclosure can also be implemented in the context of a wellbore drilling operation. For example, the bead can be released by implementing a pathway (for example, a valve that can be opened at a specified time and through which a fraction of the drilling fluid can be circulated into the annulus) to avoid the beads from needing to flow through the drill bit into the annulus.

Figure 2A:
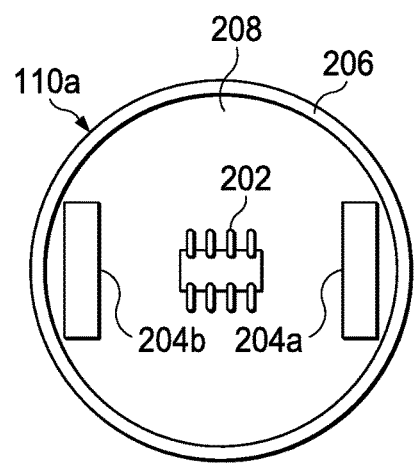
FIGS. 2A-2D are schematic diagrams showing an example of a wireless programming device to record information on microchips embedded in beads.

FIGS. 2A-2D are schematic diagrams showing a wireless programming chamber to record information on microchips embedded in beads. FIG. 2A is a schematic diagram showing an example of a bead, for example, the first bead 110a. The bead 110a comprises a data recording device 202, for example, a microchip, encapsulated within a bead shell 206. For example, the bead shell 206 can be a substantially spherical container and can be made of a nonconductive material with sufficient strength to withstand wellbore conditions at the subsurface location, for example, borehole pressure, temperature, flow velocity, equipment noise or other conditions. The bead shell 206 can be made of an electromagnetically inert material that is permeable to electromagnetic signals. The data recording device 202 can be positioned at or near substantially a center of the bead shell 206. Two magnetic plates, for example, a first magnetic plate 204a and a second magnetic plate 204b, can be positioned on either side of the data recording device 202 within the bead shell 206. Each magnetic plate can include a magnet, for example, a permanent magnet, or a plate made of ferromagnetic material or be a combination of them. As described below, the function of the plates is to correctly align the position of the data recording device 202 inside a wireless programming chamber relative to a programming antenna coil.

The bead 110a can be filled with a filler material 208. The filler material can have properties, for example, density, thermal expansion properties, chemical inertness to borehole fluids, or other properties, that allow the data recording device 202 to be carried to the surface 106 without damaging the data recording device 202, the data stored on the device 202, or the bead 110 itself. For example, the filler material 208 can have a density sufficient to allow the bead 110 to float quickly to the surface 106. In some implementations, the filler material 208 can be a light weight porous, a foam-like material, a light resin, an incompressible liquid (for example, silicone oil or some light hydraulic oil) or a combination of them.

Figure 2B:
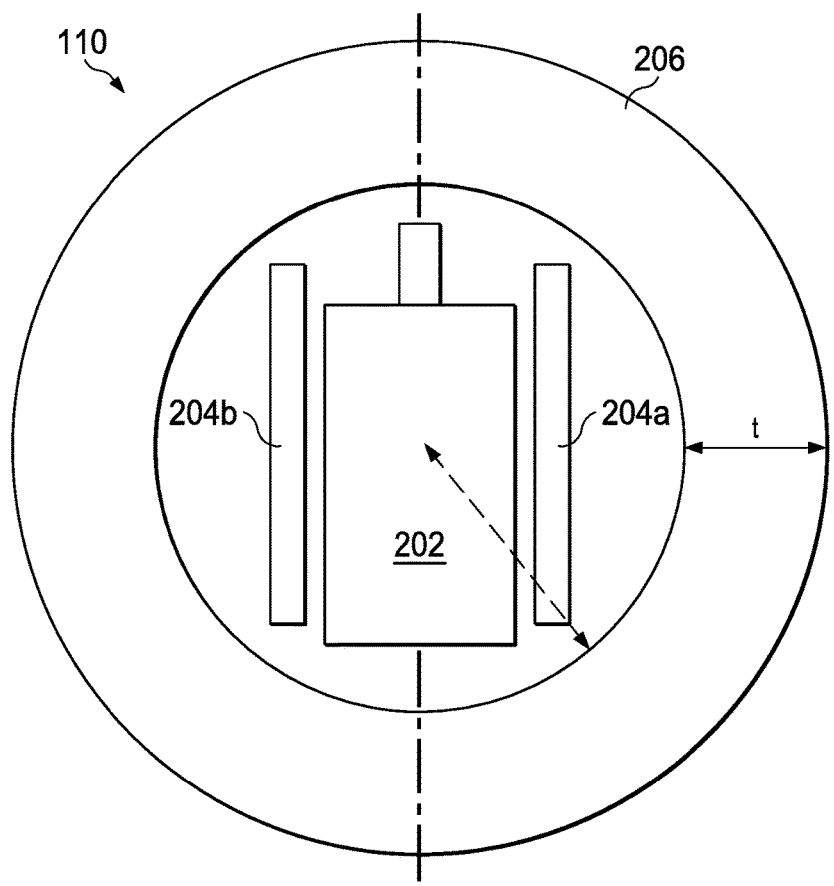

FIG. 2B is a schematic diagram of an example of the bead 110 showing example dimensions. In some implementations, the bead 110 can have a diameter "d" ranging between 1 cm and 2 cm. The bead shell 206 can have a thickness "t" ranging between 2 mm and 5 mm. Each magnetic plate can be square having a side "h" determined using Equation 1.

$$h=0.70\times(d-2t) \tag{Equation 1}$$

Alternatively, each magnetic plate can have any quadrilateral, for example, rectangular shape, or a non-quadrilateral shape, for example, circular, triangular, polygonal shape.

In addition, each magnetic plate can have a thickness of about 1 mm. The thickness of the bead shell 206 and a material selected for manufacturing the bead shell 206 can depend on factors including a hydrostatic pressure that the bead shell 206 must withstand at the subsurface location. In some implementations, the data recording device 202 can include antennae and associated circuitry, for example, signal receiving and transmitting circuitry, filtering circuitry, memory, writing circuitry or other circuitry. The components of the data recording device 202 can be mounted on a single substrate using, for example, integrated circuit manufacturing techniques. For example, a receiving antenna can be mechanically attached to a printed circuit board along with the microchip or embedded within the silicon substrate. The assembly can then be immersed in a foam or resin made of the filler material 208. The bead shell 206 can include two portions, for example, two half shells, that are arranged together, for example, glued and sealed together. Alternatively or in addition, the bead shell 206 can include a bracket built within one of the half shells. The filler material 208 encompassing the data recording device 202 can be sealed within the bead shell 206. In some implementations, the beads can be configured to communicate with the circuitry in the recording chamber. For example, at the end of a recording session, the circuitry in the recording chamber can transmit a signal to the beads in response to which the beads can broadcast the recorded data. The circuitry in the recording chamber can be configured to detect and correct recording errors of the data stored in the beads.

Figure 2C:
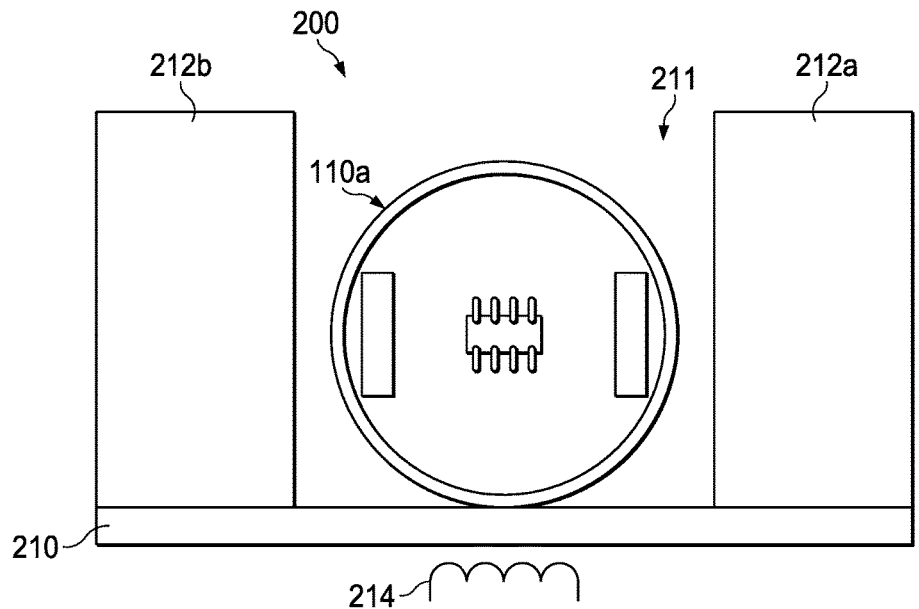

FIG. 2C is a schematic diagram of a side view of a wireless programming device 200 to record data onto a bead, for example, the bead 110a. The wireless programming device 200 comprises two bead orienting magnets, for example, a first magnet 212a and a second magnet 212b, arranged on a base 210 to form a chamber 211 sized to receive the bead 110a. The wireless programming device 200 can also include a power and recording coil 214 configured to record data on to the data recording device 202. The power and recording coil 214 can be similar to commercial devices that are configured to wirelessly power and program microchips, for example, radio frequency tags.

The bead orienting magnets 212a and 212b can operate in cooperation with the magnetic plates 204a and 204b to align the data recording device 202, relative to the power and recording coil 214, to enable the coil 214 to write data to the data recording device 202. The strength of each magnet or magnetic plate, or both, can be sufficient to align the bead 110a properly within the chamber 211 relative to the coil 214. The strength can also be sufficient to ensure that the bead 110a is held in place in deviated wells. The magnetic fields associated with each magnet or magnetic plate or both can be static, i.e., non-varying in time and in space, and, therefore, cannot generate electromagnetic interference when no significant movement exists between the bead 110a and the bead orienting magnets. Because the bead 110a is substantially spherical, the likelihood that the bead orienting magnets will cooperate with the magnetic plates in the bead 110a to orient the data recording device 202 relative to the coil 214 is substantially high. This is because there would be a single, preferred, stable position where the North Pole of the bead orienting magnet aligns by magnetic attraction force with the South Pole of the magnetic plate in the bead 110a.

Figure 2D:
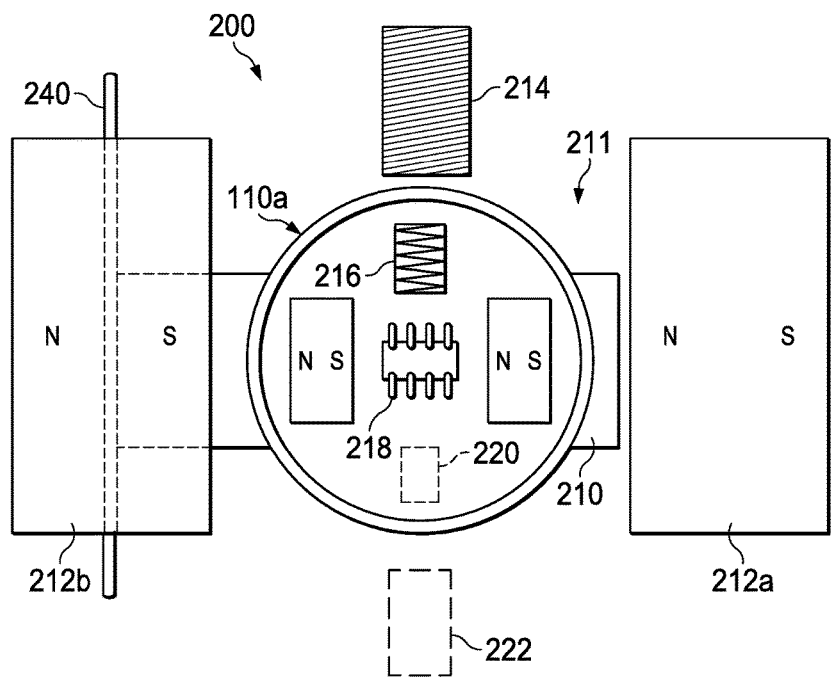

In some implementations, the likelihood of properly orienting the data recording device 202 relative to the coil 214 can be increased by shaking the base 210, for example, turning the rotating base by a few degrees about a hinge 210 (FIG. 2D). Such action would make the spherical bead change its position and cause the magnetic forces to act to align the bead in the proper position to improve the electromagnetic coupling between the transmitter and receiver coils.

FIG. 2D is a schematic diagram of a top view of a wireless programming device 200 to record data on to a bead, for example, the bead 110a. As shown in FIG. 2D, the powering and recording coil 214 is not directly below the base 210 when the wireless programming device 200 is viewed from above. Rather, the coil 214 is offset from the base 210 to allow the bead 110a to be released into the wellbore 100, as described later. Also, FIG. 2D shows that the data recording device 202 includes a bead coil 216 inside the bead 110a. The bead coil 216 can be positioned relative to the microchip 218 such that the microchip 218, the bead coil 216, and the coil 214 are arranged in a straight line when the bead 110a is aligned within the chamber 211. In some implementations, an additional bead coil 220 can be positioned inside the bead 110a and an additional powering and recording coil 222 can be positioned outside the bead 110a. The additional coils 220 and 222 can be placed symmetrically, that is, 180 degrees opposite, to the bead coil 216 and the coil 214.

FIG. 2E is a schematic diagram of a powering and recording coil 214 writing data to a data recording device 202. In some implementations, the coil 214 acts as an antenna to transmit and receive electromagnetic power to the bead coil 216 through electromagnetic field coupling (induction). When the coil 214 and the bead coil 216 are aligned coaxially, a high degree of coupling can be achieved. The data transmission signal can be a low-frequency signal, for example, in the range of hundreds of kilohertz, for power transmission, and a high frequency signal, for example, in the range of 10 MHz to 2.5 GHz, for communication. As shown in FIG. 2E, the flux lines from the coil 214 pass through the electromagnetic permeable walls of the base 210 and the bead shell 206 to communicate with the bead coil 216. The data recording device 202 includes a central processor that receives the data from the coil 214 and records the subsurface wellbore information on to the data recording device 202.

FIGS. 3A-3D are schematic diagrams showing an example of a first implementation of a bead feeder mechanism 300 to position beads into the wireless programming device. The bead feeder mechanism 300 includes a feeder tube 302 to hold multiple beads, for example, beads 304a, 304b, 304c, 304d, 304e, or more or fewer beads, each of which is substantially similar to the bead 110a described above. For example, the feeder tube 302 can be a substantially cylindrical hollow tube with an inner diameter larger than an outer diameter of each bead. The multiple beads can be stacked one about the other in the feeder tube 302. The bead feeder mechanism 300 can include a cup 306 positioned below a lower outlet of the feeder tube 302. The cup 306 is configured to receive a bead from the feeder tube 302 and to place the bead in the wireless programming device 310, for example, in the chamber formed between the two bead orienting magnets.

Figure 3B:
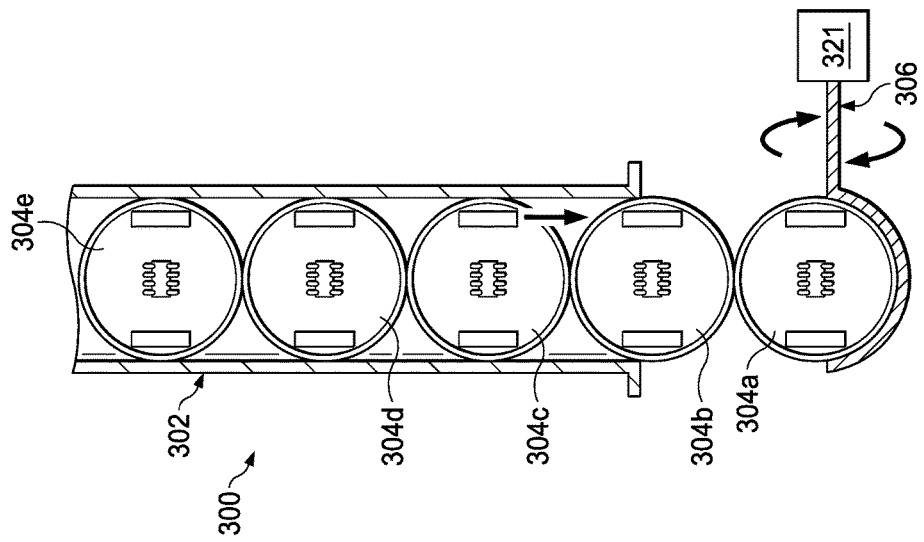
Figure 3A:
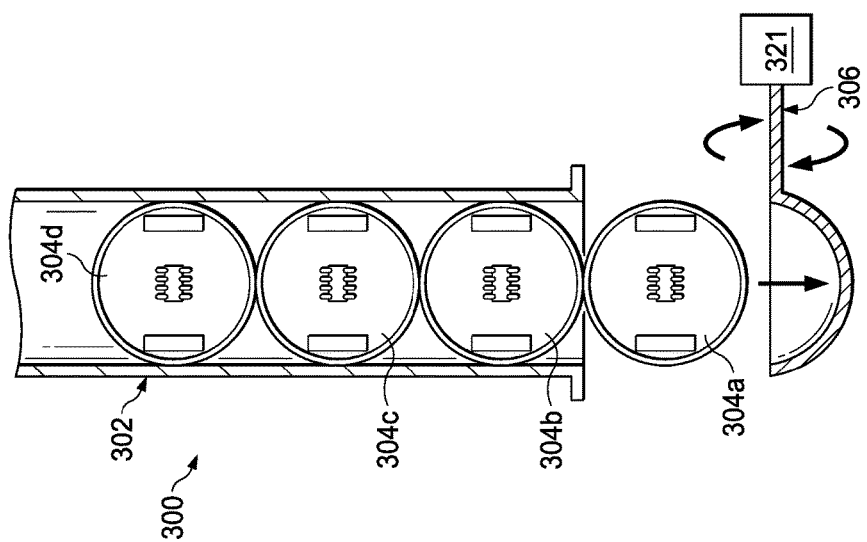

FIG. 3A shows the cup 306 positioned to receive the bead 304a from the feeder tube 302. FIG. 3B shows the bead 304a positioned in the cup 306. FIG. 3C shows the cup 306 inverted by 180° to drop the bead 304a into the wireless programming device 310. FIG. 3D shows a perspective view of the cup 306. The cup 306 includes a cup shell 312 and a mouth 314 to receive the bead. The cup 306 also includes a cup axle 316 to rotate the cup 306 between a position in which the mouth 314 faces the feeder tube outlet to receive a bead and a position in which the mouth 314 faces the wireless programming device 310. In some implementations, the cup axle 316 can be connected to a stepper motor 321 that is configured to rotate the cup axle 316 and, in turn, the cup 306. As described above, the powering and recording coil of the wireless programming device 310 is not directly below the base that receives the bead; rather, the coil is offset from the base. After the subsurface information is recorded onto the data recording device, the base can be moved (for example, rotated about a hinged axis as described above with reference to FIG. 2D) to allow the bead to enter the wellbore. Because the coil is offset from the base, the coil does not interfere with the path of the bead to the wellbore.

FIGS. 4A-4H are schematic diagrams showing an example of a second implementation of a bead feeder mechanism 400 to position beads into the wireless programming device. The bead feeder mechanism 400 includes a housing 401, with an outlet 438 at the bottom of the housing 401 through which the beads (for example, beads 110a, 110b, or other beads) exit the bead feeder mechanism 400 to enter the wellbore. The bead feeder mechanism 400 includes a recording chamber 402, which includes components configured to write subsurface wellbore information on to the data recording devices carried in the beads. For example, the recording chamber 402 can include an inter-device communications module 404, a data storage module 406, systems control circuitry 408, data wiring circuitry 410, and a power and recording coil 412. The components in the recording chamber 402 can be connected to each other and to components outside the housing 401, for example, sensors positioned at different locations in the wellbore or connected to subsurface wellbore equipment, or both. The components in the recording chamber 402 can receive subsurface wellbore information from the sensors in the wellbore and write the information to the data recording devices in the microchip beads, using techniques such as those described above with reference to FIGS. 2A-2D.

Figure 4A:
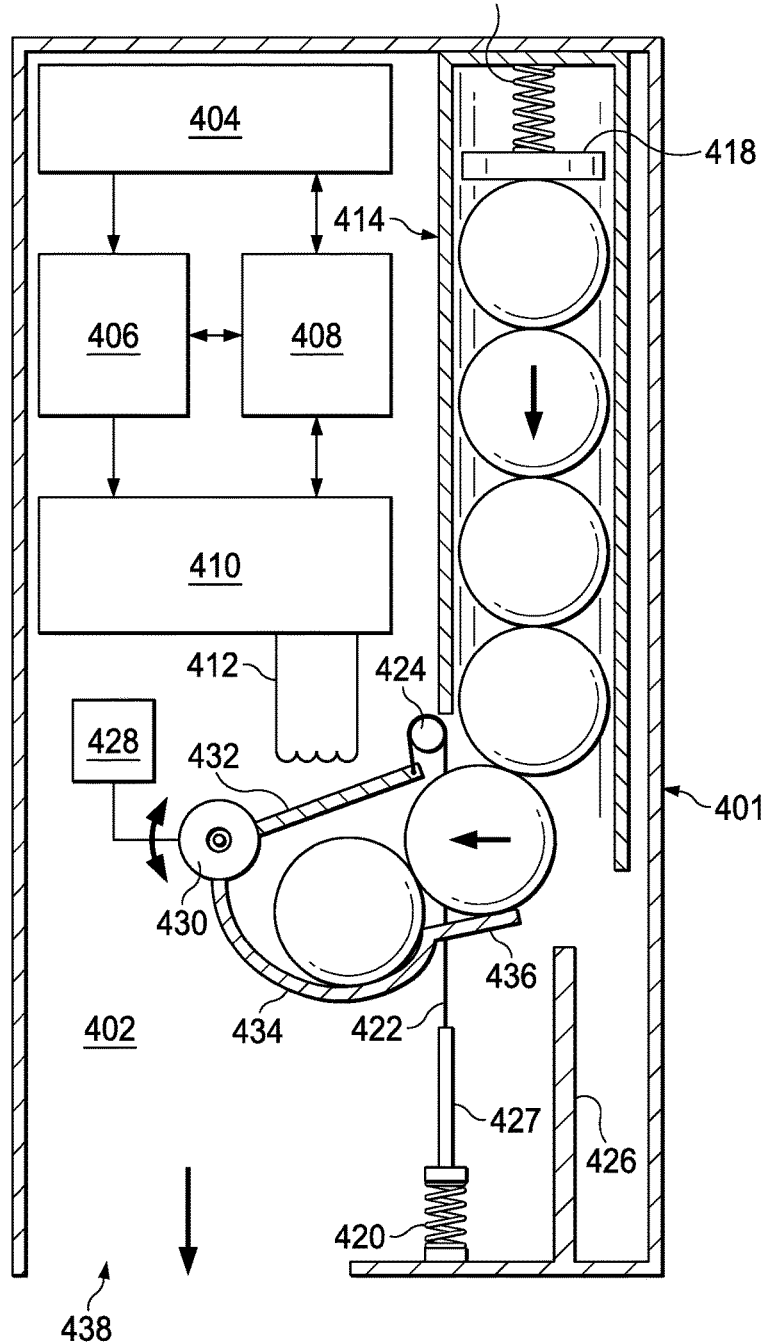

The bead feeder mechanism 400 includes a feeder tube 414 in which multiple beads are vertically stacked. For example, the feeder tube 414 can be a cylindrical tube with an inner diameter larger than an outer diameter of a bead. The lower end of the feeder tube 414 can have an outlet opening that is not perpendicular to the longitudinal axis of the feeder tube 414. As shown in FIG. 4A, an edge of the feeder tube 414 closer to a wall of the housing 401 can be longer than an edge of the feeder tube 414 away from the wall of the housing 401 to allow a bead from the feeder tube 414 to be received by a bead holder (described below). In some implementations, the feeder tube 414 can measure about 160 cm in length and 20 mm in external diameter. About 75% of the internal volume of the feeder tube 414 can be filled with beads allowing space for other components described below. In some implementations, the single feeder tube 414 can be replaced by a carousel that can include multiple feeder tubes, each tube housing multiple, vertically stacked beads.

The feeder tube 414 can include a spring 416 having a first end attached to an upper end surface of the feeder tube 414 and a second end attached to a piston 418. Initially, the spring 416 can be compressed when loading multiple beads into the feeder tube 414. When the bottommost bead in the feeder tube 414 exits the feeder tube 414, the vertical stacks of beads can be pushed downwards by the piston 418 due to expansion of the spring 416. In some implementations, the spring 416 can be replaced by a hydraulic or pneumatic mechanism to move (i.e., extend or retract) the piston 418.

The bead feeder mechanism 400 includes a bead holder that is rotatable by a stepper motor 430, which is connected to motor control circuitry 428, which, in turn, is connected to the data writing circuitry 410 of the recording chamber 402. The motor control circuitry 428 is able to control the motor 430 displacement using programmable sequences of steps clock- or counterclockwise. The bead holder can include a first substantially straight member 432, a curved member 434, and a second substantially straight member 436. One end of the first substantially straight member 432 can be connected to the stepper motor 430. The other end of the first substantially straight member 432 can be connected to a first end of a cable 422 that runs over a pulley 424. The second end of the cable 422 is connected to a first end of a movable bead stopper member 427. The second end of the movable bead stopper member 427 can be connected to a first end of a spring 420. The second end of the spring 420 can be connected to a bottom surface of the housing 401. A first end of the curved member 434 can be connected to the stepper motor 430. The second end of the curved member 434 can be connected to a first end of the substantially straight member 436. Under this arrangement, the bead holder defines a cavity to receive a bead from the feeder tube 414.

FIG. 4A shows a schematic drawing of a bead being received by the cavity in the bead holder. In this configuration, the spring 416 is compressed and the spring 420 is relaxed. The stepper motor 430 rotates clockwise to align the opening in the cavity with the outlet opening of the feeder tube 414. A bead is lowered into the cavity by gravity and by the force of the spring 416 transferred to the beads through the piston 418.

FIG. 4B shows a schematic drawing of controlling lowering of beads into the cavity in the bead holder. When a bead is lowered into the cavity, the stepper motor 430 continues to rotate clockwise. The continued rotation lowers the second end of the first substantially straight member 432, which pulls the cable 422 downwards and the movable bead stopper member 427 upwards against the force of the spring 420. In some implementations, the recording chamber 402 can be configured to write data to the data recording device embedded in the bead received by the bead holder. In such implementations, the stepper motor 430 can be configured to cease rotation for a duration sufficient to write data to the data recording device. In some implementations, the bead coil 216 embedded in the bead, which is configured to receive and transmit data, can be used as a transmitter that provides feedback information, such as a memory data checksum, to the bead recorder control circuitry to confirm that data has been properly received by and written to the data recording device. The recording coil 412 can also act as a receiving antenna. For example, the stepper motor 430 can be configured to remain at rest until a data write confirmation is received from the data recording device in the bead.

FIG. 4C shows a schematic diagram of controlling dispensing of beads from the bead feeder mechanism 400. The bead feeder mechanism 400 includes a stationary bead stopper member 426 having a first end attached to a bottom surface of the housing 401 and a second end extending upward towards the feeder tube 414. As the movable bead stopper member 427 rises upward in response to a rotation of the stepper motor 430, the end of the movable bead stopper member 427 and the upward extending end of the stationary bead stopper member 426 cooperate to impede the downward motion of a second bead in the feeder tube 414.

Figure 4D:
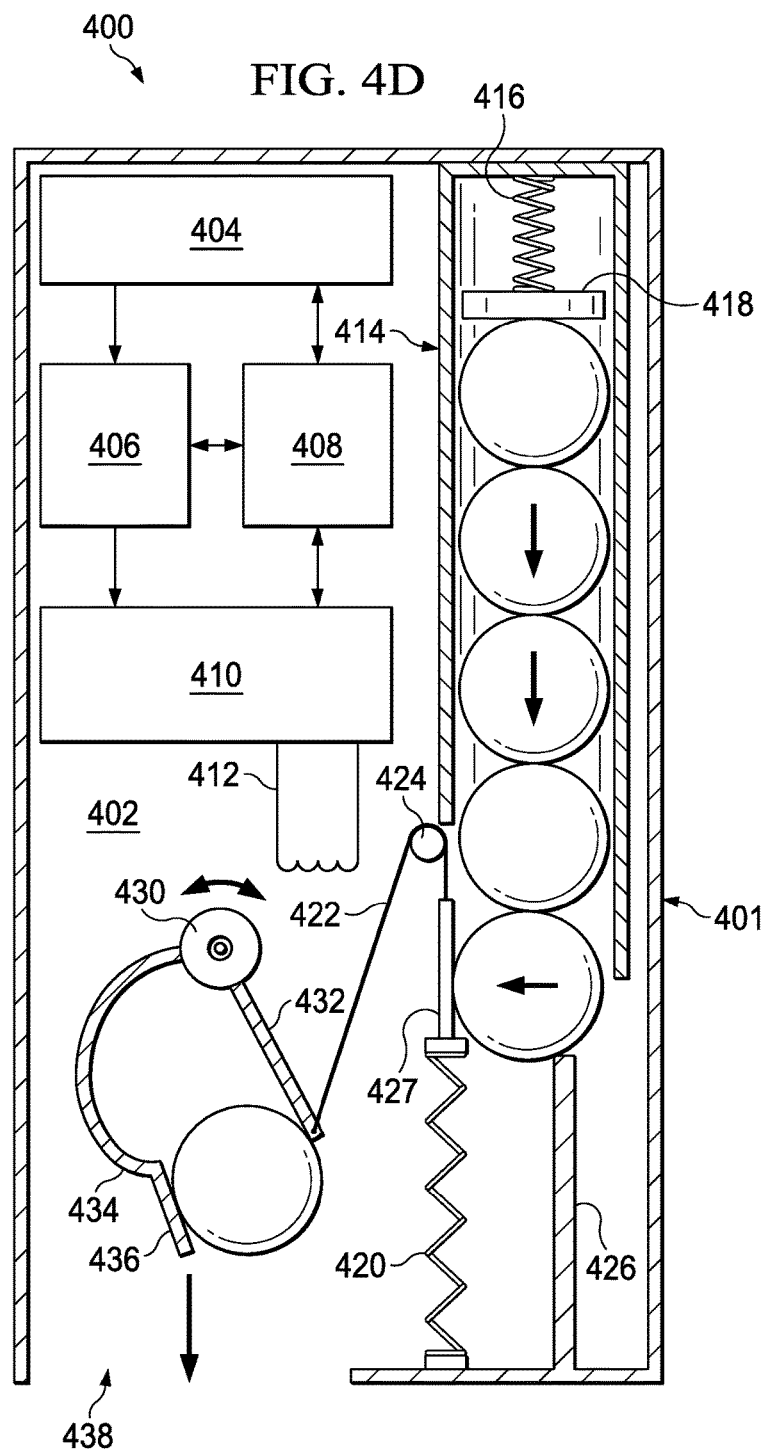

FIG. 4D shows a schematic diagram of controlling dispensing of beads from the bead feeder mechanism 400. As the stepper motor 430 continues to rotate clockwise, the movable bead stopper member 427 continues to rise to prevent a second bead from exiting the feeder tube 414. The spring 420 expands beyond its relaxed position and the opening in the bead holder proceeds towards the outlet 438.

FIG. 4E shows a schematic diagram of controlling dispensing of beads from the bead feeder mechanism 400. As the stepper motor 430 continues to rotate clockwise, the opening to the bead holder faces downward and the bead in the bead holder drops into the outlet 438 due to gravity.

Figure 4F:
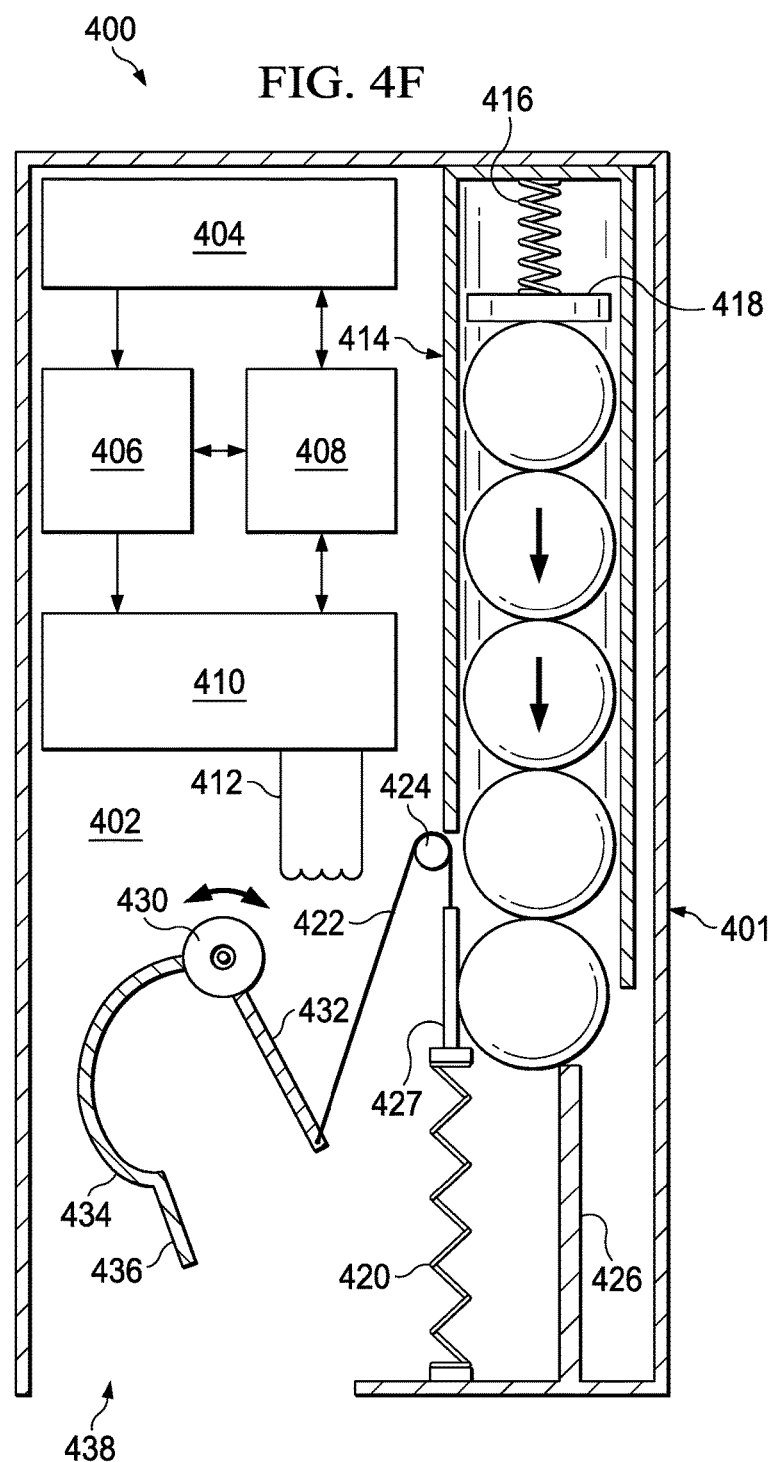

FIG. 4F shows a schematic diagram of controlling dispensing of beads from the bead feeder mechanism 400. In this configuration, the bead has fallen into the outlet 438. The spring 420 contracts to return to its relaxed position, which pulls the moveable bead stopper member 427 downward and the pulls the first substantially straight member 432 upwards causing the bead holder to rotate counter clockwise. In some implementations, the stepper motor 430 can also be operated to rotate the bead holder counter clockwise.

FIG. 4G shows a schematic diagram of controlling dispensing of beads from the bead feeder mechanism 400. As the spring 420 contracts and the bead holder rotates counter clockwise, the moveable bead stopper member 427 lowers, and the first substantially straight member 432 begins to return to a substantially horizontal orientation.

Figure 4H:
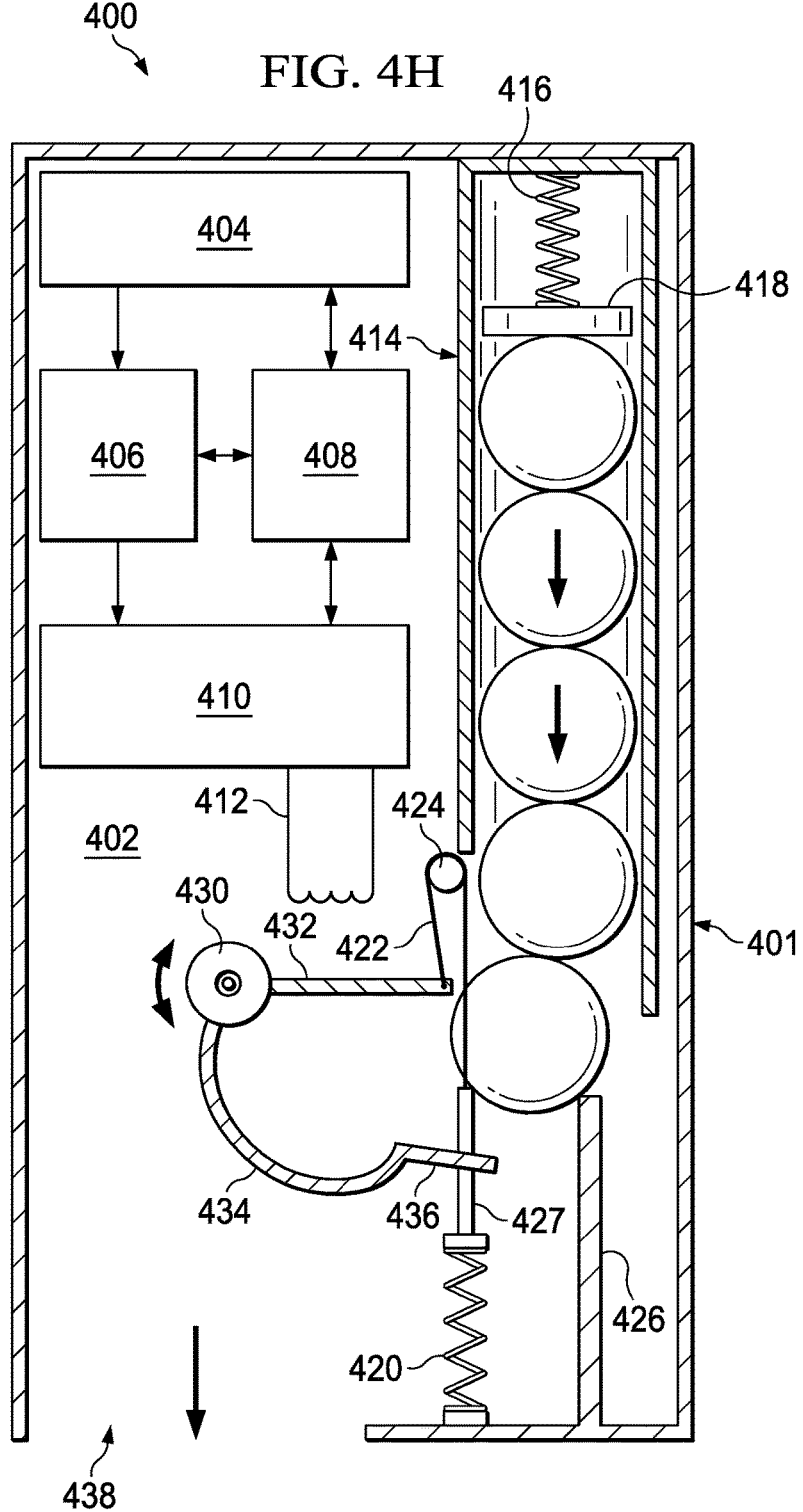

FIG. 4H shows a schematic diagram of controlling dispensing of beads from the bead feeder mechanism 400. When the first substantially straight member 432 has returned to its substantially horizontal orientation and the moveable bead stopper member 427 has been lowered nearer to the bottom of the housing 401, the cavity in the bead holder becomes sufficiently open to receive the next bead from the feeder tube 414. The sequence of operations described starting at FIG. 4A are then repeated to dispense the next bead into the wellbore. The recording action can be set to be automatic (that is, programmed to occur based on time such as date or elapsed intervals), by event (such as a temperature threshold crossing event, a flow surge or stoppage, a pressure event, a vibration event or other event) or triggered through a surface command.

Figure 5:
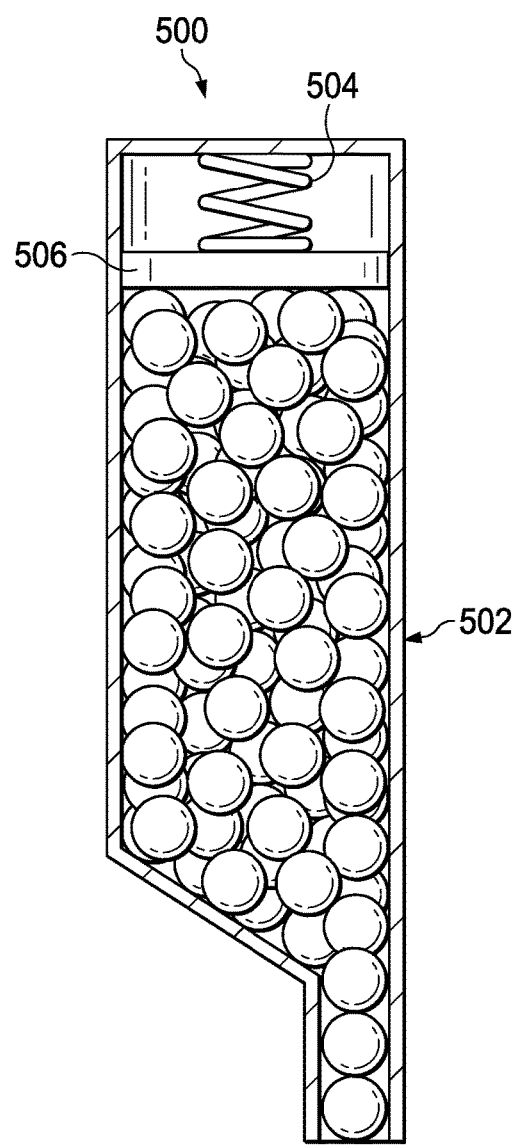
FIG. 5 is a schematic diagram showing an example of a feeder tube.

FIG. 5 is a schematic diagram showing an example of a feeder tube 500, which can be used in place of the feeder tube 414 described above. The feeder tube 500 includes a housing 502, a spring 504, and a piston 506. A first end of the spring 504 is attached to an upper surface of the housing 502. A second end of the spring 504 is attached to the piston 506. The upper portion of the housing 502 has a greater cross-sectional dimension than a lower portion of the housing 502. Consequently, the upper portion allows more than one bead to be stored on a plane perpendicular to a longitudinal axis of the feeder tube 500. The lower end is sized to allow only one bead to be stored on the plane perpendicular to the longitudinal axis. In some implementations, the feeder tube 500 can be cylindrical with the internal diameter of the upper portion being about 77 mm. The internal diameter of the lower portion can be smaller than that of the upper portion and larger than an outer diameter of a bead (for example, 16 mm). The height of the feeder tube 500 can be about 1.4 meters. The beads can be packed in the upper portion using a rhombohedral packing scheme. When packed, the beads can compress the spring 504. The beads can be pushed out of the feeder tube 500, one bead at a time, under gravity and by the piston 506 in response to an expansion of the spring 504.

Figure 6A:
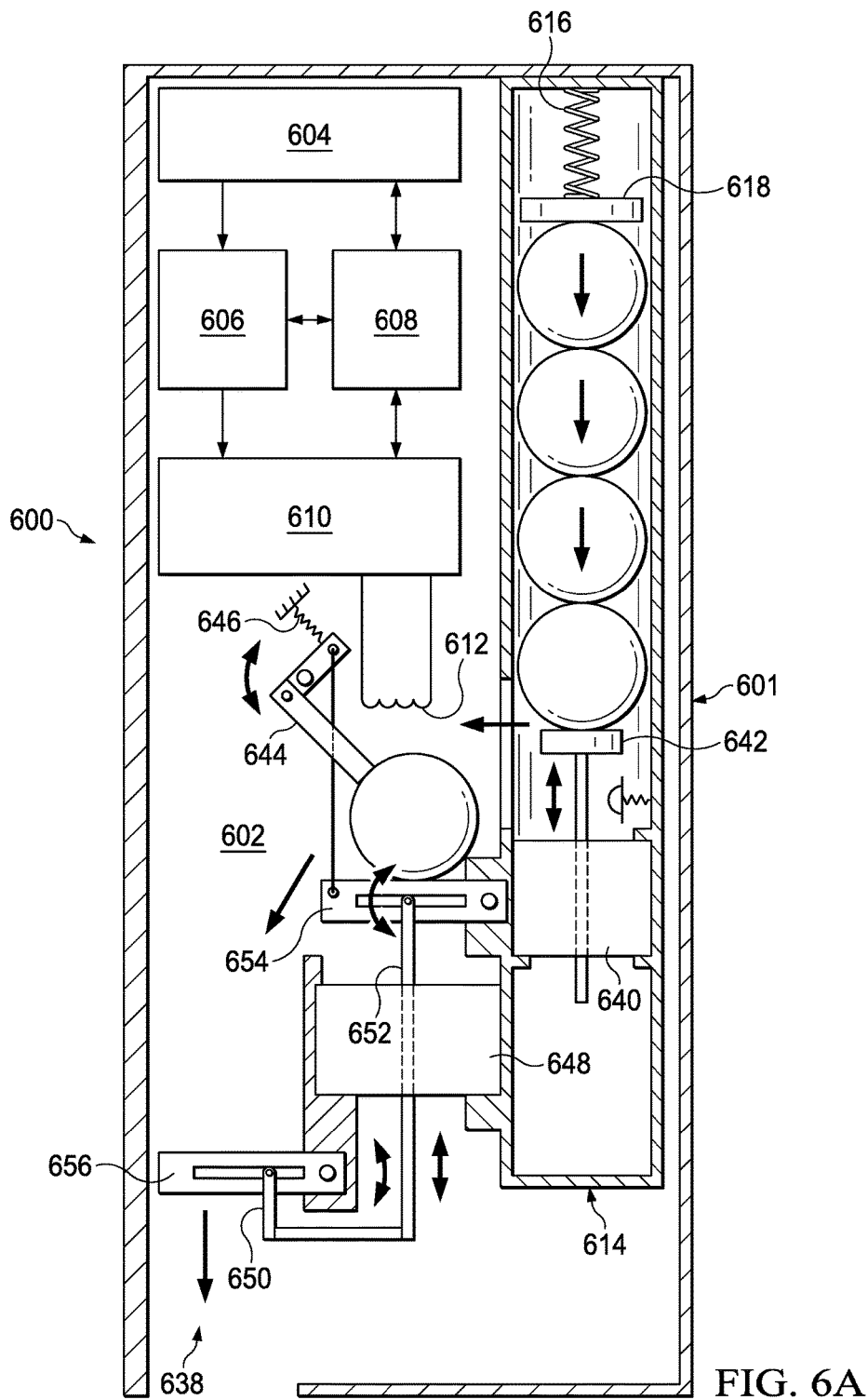
FIGS. 6A-6C are schematic diagrams showing an example of a third implementation of a bead feeder mechanism to position beads into the wireless programming device.
Figure 6B:
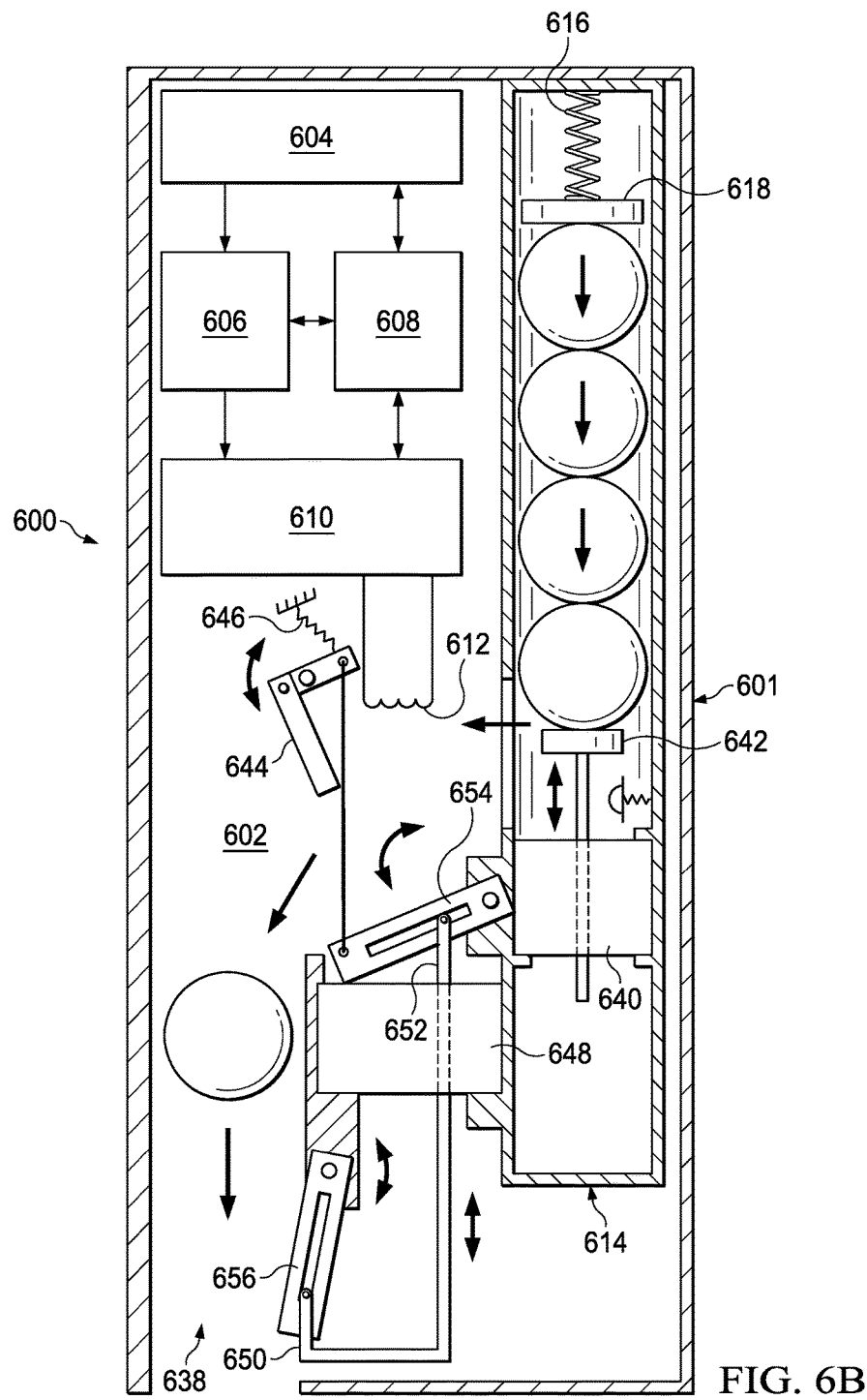
Figure 6C:
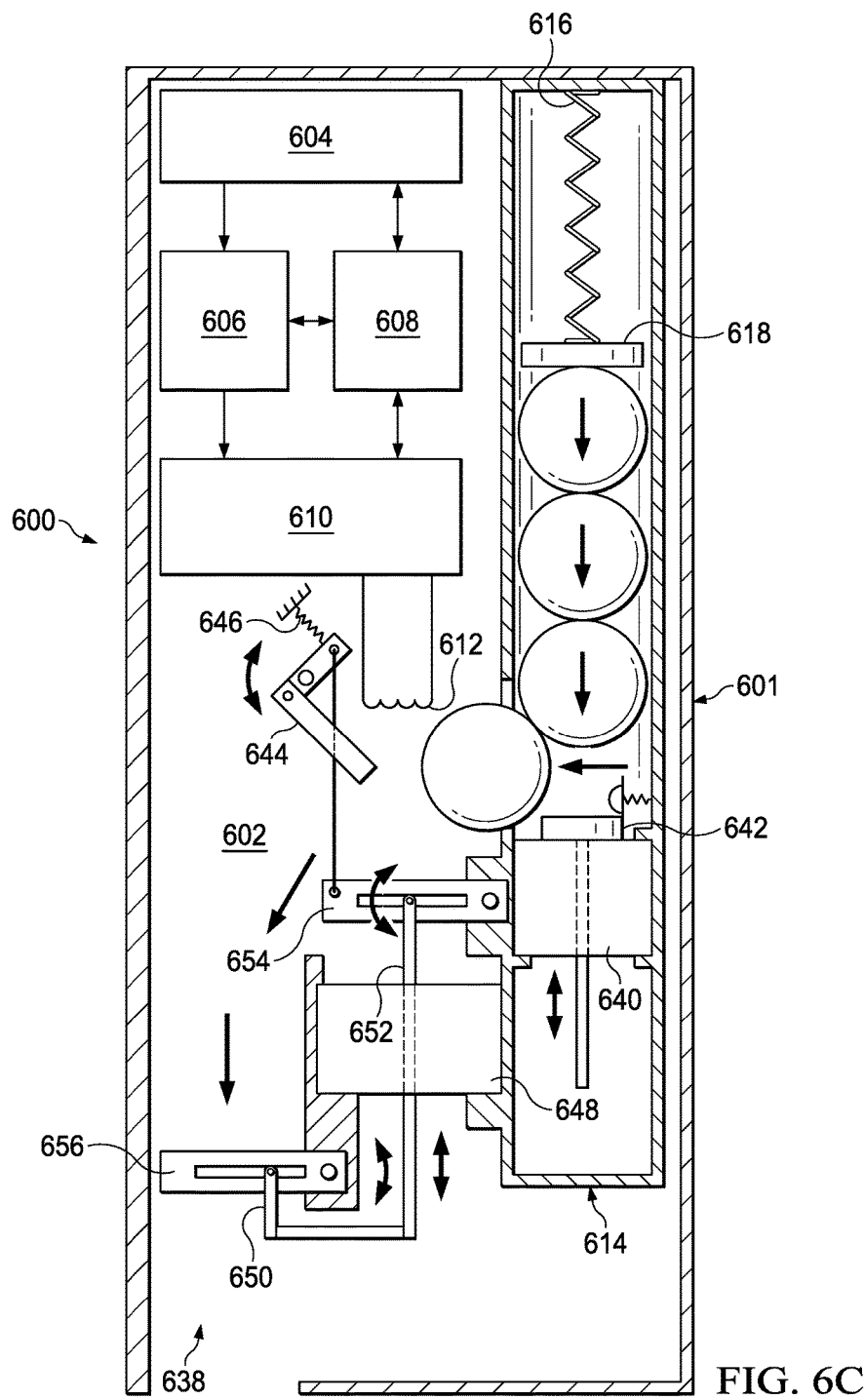

FIGS. 6A-6C are schematic diagrams showing an example of a third implementation of a bead feeder mechanism 600 to position beads into the wireless programming device. FIG. 6A shows a bead being lowered into a recording chamber so that subsurface wellbore information can be written onto the data recording devices carried in the bead. FIG. 6B shows the bead being traversed toward the outlet of the bead feeder mechanism. FIG. 6C shows the bead feeder mechanism being re-oriented to receive another bead in the recording chamber. The bead feeder mechanism 600 includes a housing 601, with an outlet 638 at the bottom of the housing 601 through which the beads (for example, beads 110a, 110b, or other beads) stored in the feeder tube 614 exit the bead feeder mechanism 600 to enter the wellbore. The feeder tube 614 can include a spring 616, having a first end attached to an upper end surface of the feeder tube 614 and a second end attached to a piston 618. Initially, the spring 616 can be compressed when loading multiple beads into the feeder tube 614. When the bottommost bead in the feeder tube 614 exits the feeder tube 614, the vertical stacks of beads can be pushed downwards by the piston 618 due to expansion of the spring 616. In some implementations, the spring 616 can be replaced by a hydraulic or pneumatic mechanism to move the piston 618.

The bead feeder mechanism 600 includes a recording chamber 602, which includes components configured to write subsurface wellbore information on to the data recording devices carried in the beads. For example, the recording chamber 602 can include an inter-device communications module 604, a data storage module 606, systems control circuitry 608, data wiring circuitry 610, and a power and recording coil 612. The components in the recording chamber 602 can be connected to each other and to components outside the housing 601, for example, sensors positioned at different locations in the wellbore or connected to subsurface wellbore equipment or both. The components in the recording chamber 602 can receive subsurface wellbore information from the sensors in the wellbore and write the information to the data recording devices in the microchip beads using techniques such as those described above with reference to FIGS. 2A-2D.

The bead feeder mechanism 600 includes a motor 640 positioned in the feeder tube 614 below the multiple beads. A piston 642 is connected to the motor 640 such that the motor 640 can extend and retract the piston 642 vertically within the feeder tube 614. When the piston 640 is at its upper most position, the lowermost bead in the feeder tube 614 rests on an upper surface of the piston 642. The uppermost bead in the feeder tube 614 presses against the piston 618 compressing the spring 616. In this position, the beads in the feeder tube 614 cannot travel to the recording chamber 602.

When the motor 640 is actuated to lower the piston 642 to the lowermost position of the piston 642, the spring 616 expands causing the piston 618 to push a bead into the recording chamber 602. The bead is retained in the recording chamber 602 by a bead stopper assembly (BSA) 644 atop a base 654. The position of the bead stopper assembly 644 is controlled by a spring 646 having one end attached to an end of the BSA 644 and another end attached to a fixed surface in the bead feeder mechanism 600. In the recording chamber 602, subsurface wellbore information can be written onto the data recording devices carried in the beads by implementing techniques such as those described earlier.

As shown in FIG. 6B, after data is recorded onto the bead, a motor 648 is activated to make the linkage 650 travel downward, that is, toward the outlet 638. During downward travel, the linkage 650 rotates the BSA 644 (for example, through the linkage 652). The bead then drops from the base 654 to the base 656 to which the linkage 650 is attached. A rotation of the base 654 causes the bead to drop into the outlet 638. Subsequently, the motor 648 is activated to bring the linkage 652 to its upper travel limit, forcing the BSA 644, and the bases 654 and 656 to their original positions as shown in FIG. 6C.

Figure 7A:
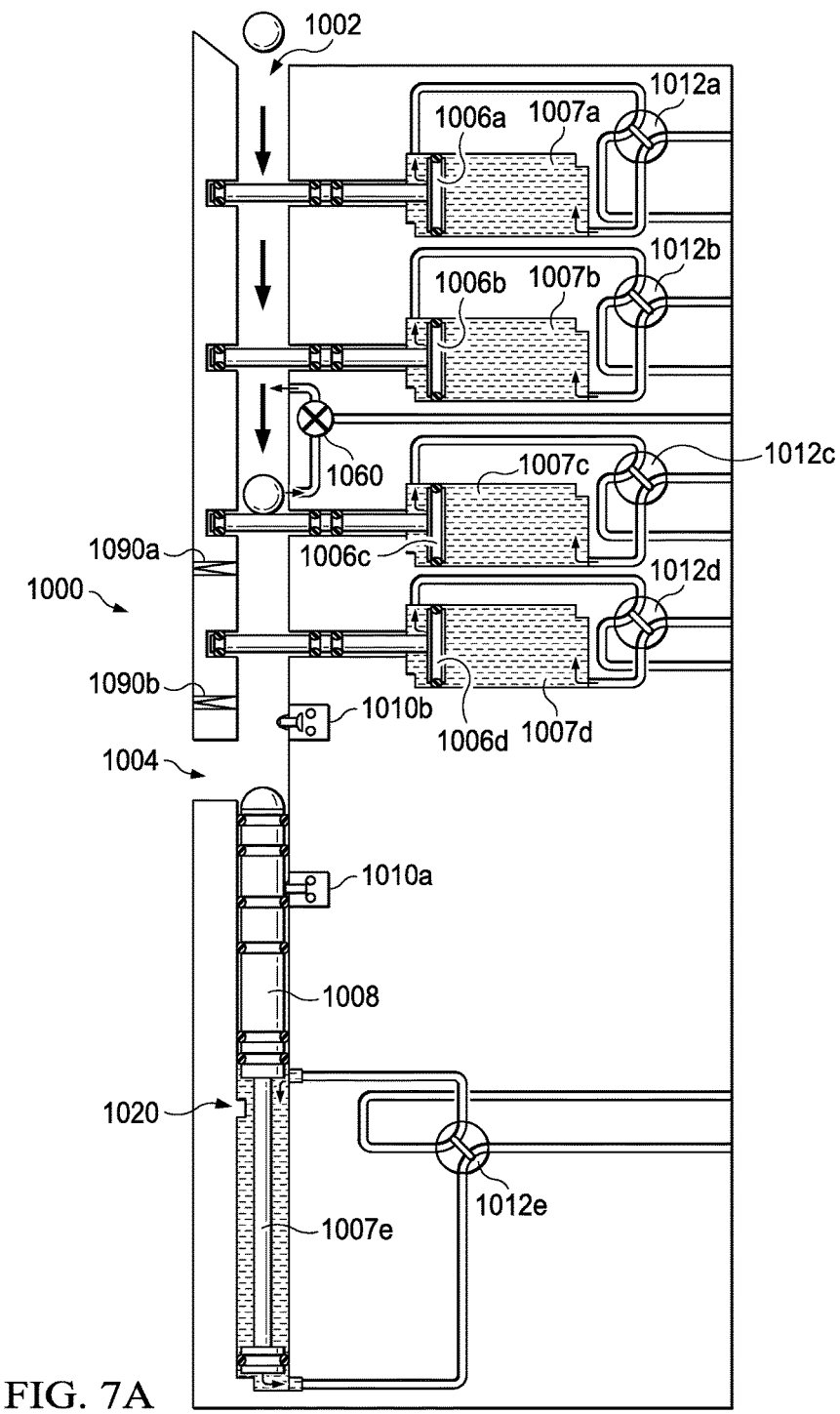
FIGS. 7A-7J are schematic diagrams showing a second implementation of a borehole dispenser to receive a bead from the bead feeder mechanism and dispense the bead into the wellbore.
Figure 7B:
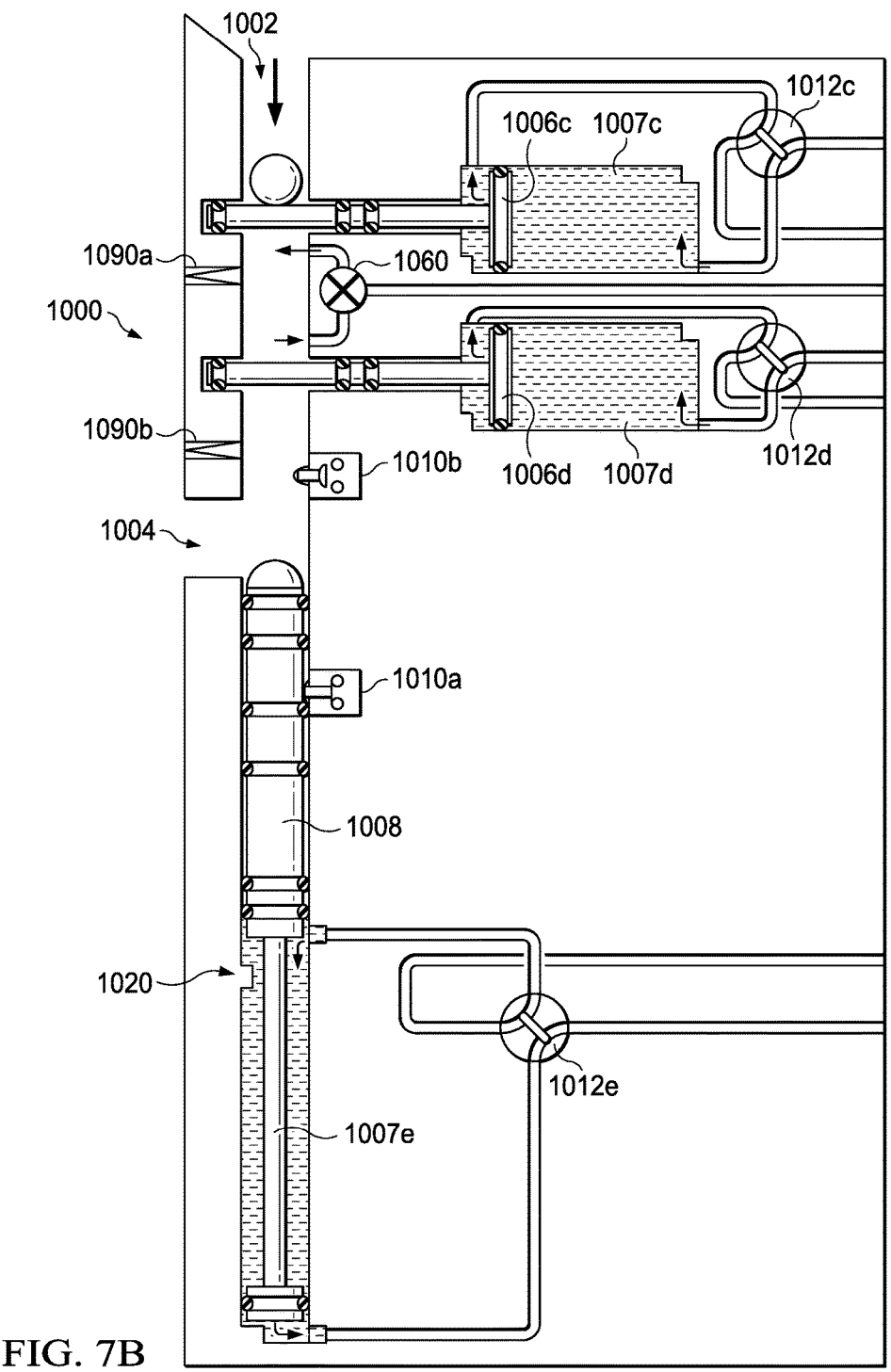

FIGS. 7A-7J are schematic diagrams showing an implementation of a borehole dispenser 1000 to receive a bead from the bead feeder mechanism and dispense the bead into the wellbore. The borehole dispenser 1000 includes an inlet chamber 1002 connected to the outlet of the bead feeder mechanism. The borehole dispenser 1000 includes an outlet chamber 1004 that leads to the wellbore. The borehole dispenser 1000 includes multiple pistons (for example, a first piston 1006a, a second piston 1006b, a third piston 1006c, a fourth piston 1006d), each configured to travel within a respective piston chamber (for example, a first piston chamber 1007a, a second piston chamber 1007b, a third piston chamber 1007c, a fourth piston chamber 1007d). Whereas the 4-piston implementation shown in FIG. 7A increases the likelihood of wellbore fluids never reaching the recording chamber, a 2-piston implementation such as those shown in FIG. 7B are sufficient for the borehole dispenser 1000 to function as intended. The borehole dispenser 1000 includes multiple hydraulic circuits, each configured to stroke a respective piston between end positions in the respective piston chamber. The borehole dispenser 1000 includes control circuitry 1014 configured to control each hydraulic circuit. The borehole dispenser 1000 additionally includes a vertically traversing piston 1008 configured to transport the bead from the inlet chamber 1002 to the outlet chamber 1004.

FIG. 7A shows a configuration in which each piston in the borehole dispenser 1000 is in an end-of-stroke position. In this configuration, the bead feeder mechanism is hydraulically isolated from the wellbore. The portion of the borehole dispenser 1000 above the piston 1006b is a dry chamber, i.e., a chamber to which the well fluid does not flow. The dry chamber receives a bead from the bead feeder mechanism and transfers the bead to the lower portion of the borehole dispenser 1000. To do so, the hydraulic circuit of each of the first piston 1006a, the second piston 1006b, the third piston 1006c and the fourth piston 1006d operate the respective solenoid valves 1012a, 1012b, 1012c and 1012d, respectively, to push the first piston 1006a, the second piston 1006b, the third piston 1006c and the fourth piston 1006d, respectively, to their respective left end-of-stroke positions.

The first switch 1010*a* is closed and the second switch 1010*b* is open. This provides feedback to the control system about the position of piston valve 1008 allowing the bead feeder mechanism to release a bead into the inlet chamber 1002 of the borehole dispenser. In the end-of-stroke position, the first piston 1006*a* extends across a bead travel path from the inlet chamber 1002 to the outlet chamber 1004, and receives the bead. The hydraulic circuit of the first piston 1006*a* operates the solenoid valve 1012*a* to withdraw the first piston 1006*a* into the piston chamber 1007*a*, allowing the bead to drop downward. The second piston 1006*b*, which, in the end-of-stroke position also extends across the bead travel path, receives the bead. The hydraulic circuit of the second piston 1006*b* operates the solenoid valve 1012*b* to withdraw the second piston 1006*b* into the piston chamber 1007*b*, allowing the bead to further drop downward. Similar operations by the solenoid valves 1012*c* and 1012*d* to withdraw the third piston 1006*c* and the fourth piston 1006*d*, respectively, allow the bead to further drop downward.

In some implementations, a fluid pump (for example, fluid pump 1060) can be disposed between two pistons, for example, piston 1006*b* and piston 1006*c*. The fluid pump 1060 can be connected to a fluid line 1052 and a fluid line 1054, each to a portion 1053 of the inlet chamber 1002 formed when each of the piston 1006*b* and the piston 1006*c* are in respective end-of-stroke positions. The fluid pump 1060 can also be connected to a fluid line 1056 that connects to the wellbore fluid. The fluid pump 1060 can draw wellbore fluid through the fluid line 1056 and flow the wellbore fluid into the portion 1053 through the fluid line 1052 and draw the wellbore fluid from the portion 1053 through the fluid line 1054. Such bi-directional flow by the fluid pump 1060 can allow the wellbore fluid to push the bead in the portion 1053 downward toward the outlet 1004, and draw the wellbore fluid from the portion 1053 into the wellbore to dry the portion 1053. One or more pumps, similar to the fluid pump 1060, can be disposed in respective portions between end-of-stroke positions of two pistons to pump wellbore fluid for pushing the beads downwards.

FIG. 7B shows a configuration in which the bead is dropped into the portion of the borehole dispenser 1000 below the dry chamber. In the configuration shown in FIG. 7B, the piston 1006*c* is in an end-of-stroke position and extends across the bead travel path and receives the bead released by the piston 1006*b* (not shown in FIG. 7B). Also, in this configuration, the piston 1006*d* is in an end-of-stroke position and extends across the bead travel path. Although not shown in FIG. 7B, the piston 1006*a* and the piston 1006*b* are in the end-of-stroke positions, thereby hydraulically sealing the dry chamber from the lower portion of the borehole dispenser 1000. In some implementations, a fluid pump 1060 similar to the fluid pump 1060 described earlier can be disposed between the pistons 1006*c* and 1006*d* to pump wellbore fluid into the portion of the inlet chamber between the two pistons 1006*c* and 1006*d*.

Figure 7C:
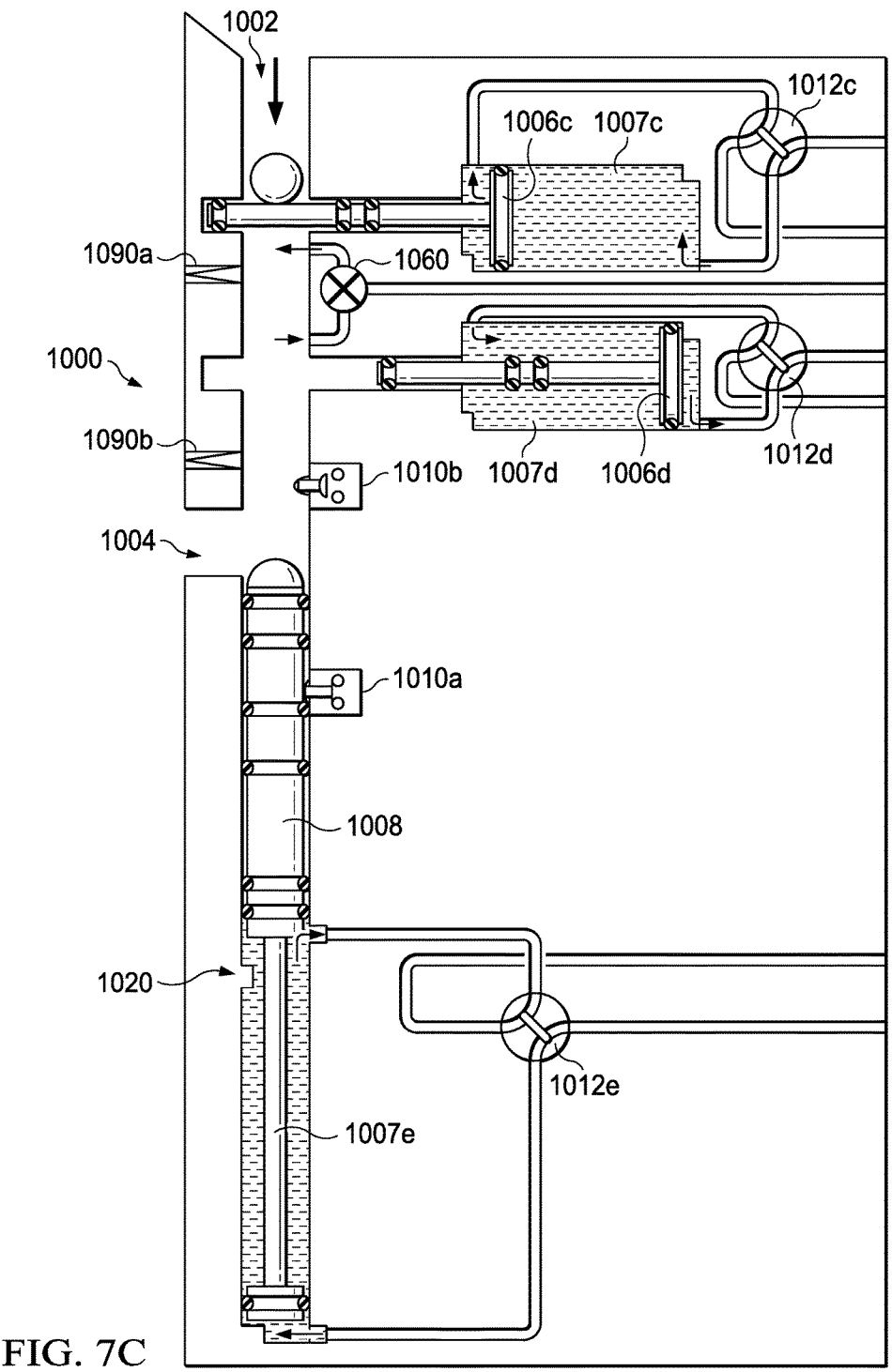

FIG. 7C shows a configuration in which the piston 1008 commences an upward travel to receive the bead resting on the piston 1006*c*. The hydraulic circuit controlling the piston 1006*d* operates the solenoid valve 1012*d* to retract the piston 1006*d* into the piston chamber 1007*d* to its right end-of-stroke position. The hydraulic circuit controlling the piston 1008 operates the solenoid valve 1012*e* to flow fluid into the bottom part of the piston chamber 1007*e*, thereby pushing the piston 1008 upward towards the pistons 1006*c* and 1006*d*.

The borehole dispenser 1000 includes a first switch 1010*a* and a second switch 1010*b*, each configured to toggle between a respective closed position in which the piston 1008 contacts the switch and an open position in which the piston 1008 does not contact the switch. For example, the switch 1010*a* is in its closed position when the piston 1008 is at its bottommost position and vice versa. Switch 1010*a* is in its closed position and switch 1010*b* is in its closed position when the piston 1008 is at its topmost position. During a portion of the travel of the piston 1008, both switches will be in their closed position. At that point, the piston 1006*d* may be closed. The switch 1010*a* being open and the switch 1010*b* being closed is an indication that the piston head of the piston 1008 is located near the seat of the piston 1006*c*. Conversely, the switch 1010*a* being closed and the switch 1010*b* being open is an indication that the piston head of the piston 1008 is located near the outlet chamber 1002.

Figure 7D:
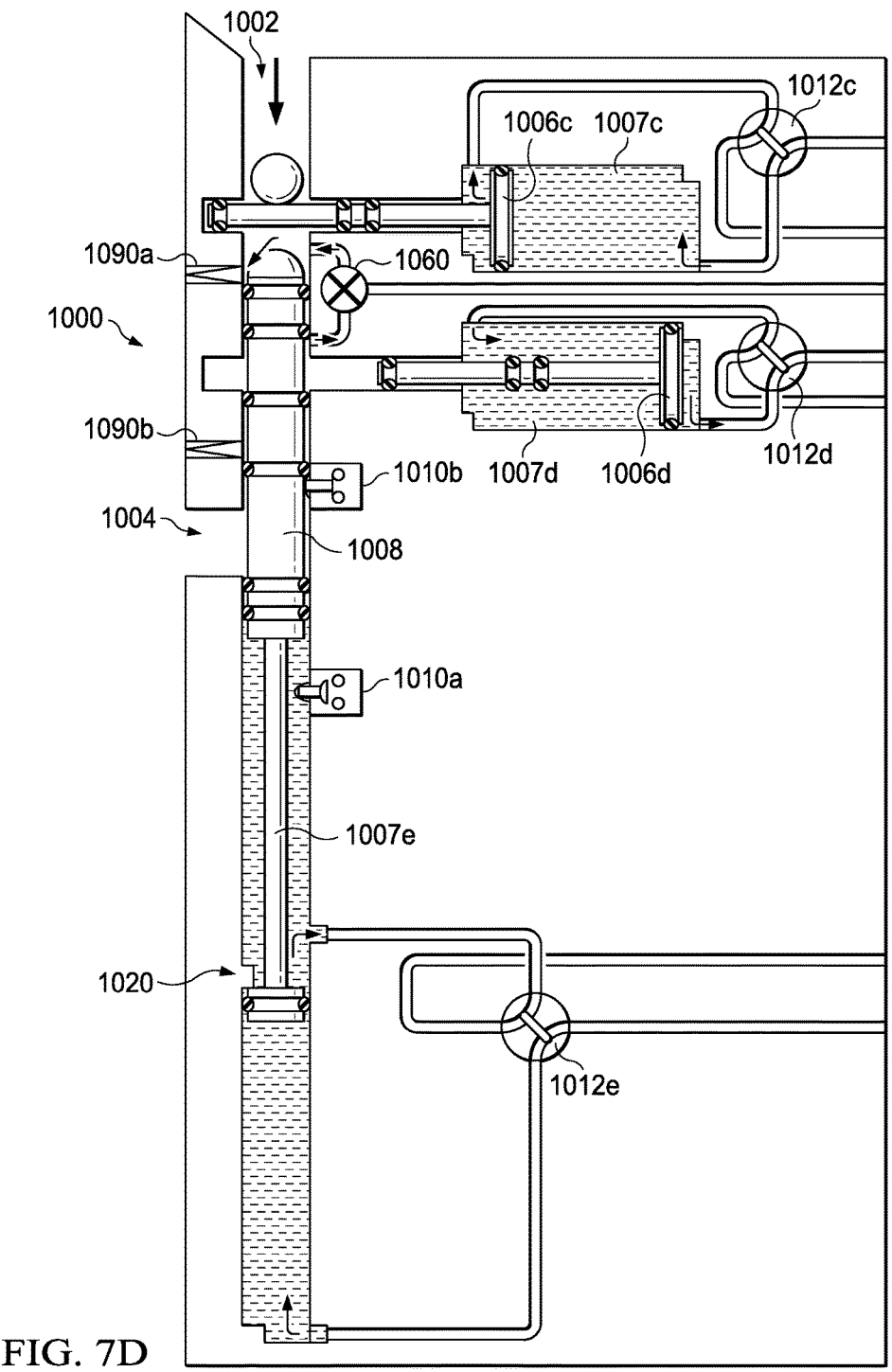

FIG. 7D shows a configuration in which the piston 1008 is substantially near its end-of-stroke position in which the piston head is substantially adjacent to the piston 1006*c*. At this point, switch 1010*a* is open and switch 1010*b* is closed, indicating the control system that piston 100*c* should be moved rightward releasing the bead to seat on top of piston 1008. The upward travel of piston 1008 is limited by feature 1020 which also prevents the piston 1008. An upward distance by which the piston 1008 can travel is controlled, for example, limited by, the feature 1020.

Figure 7E:
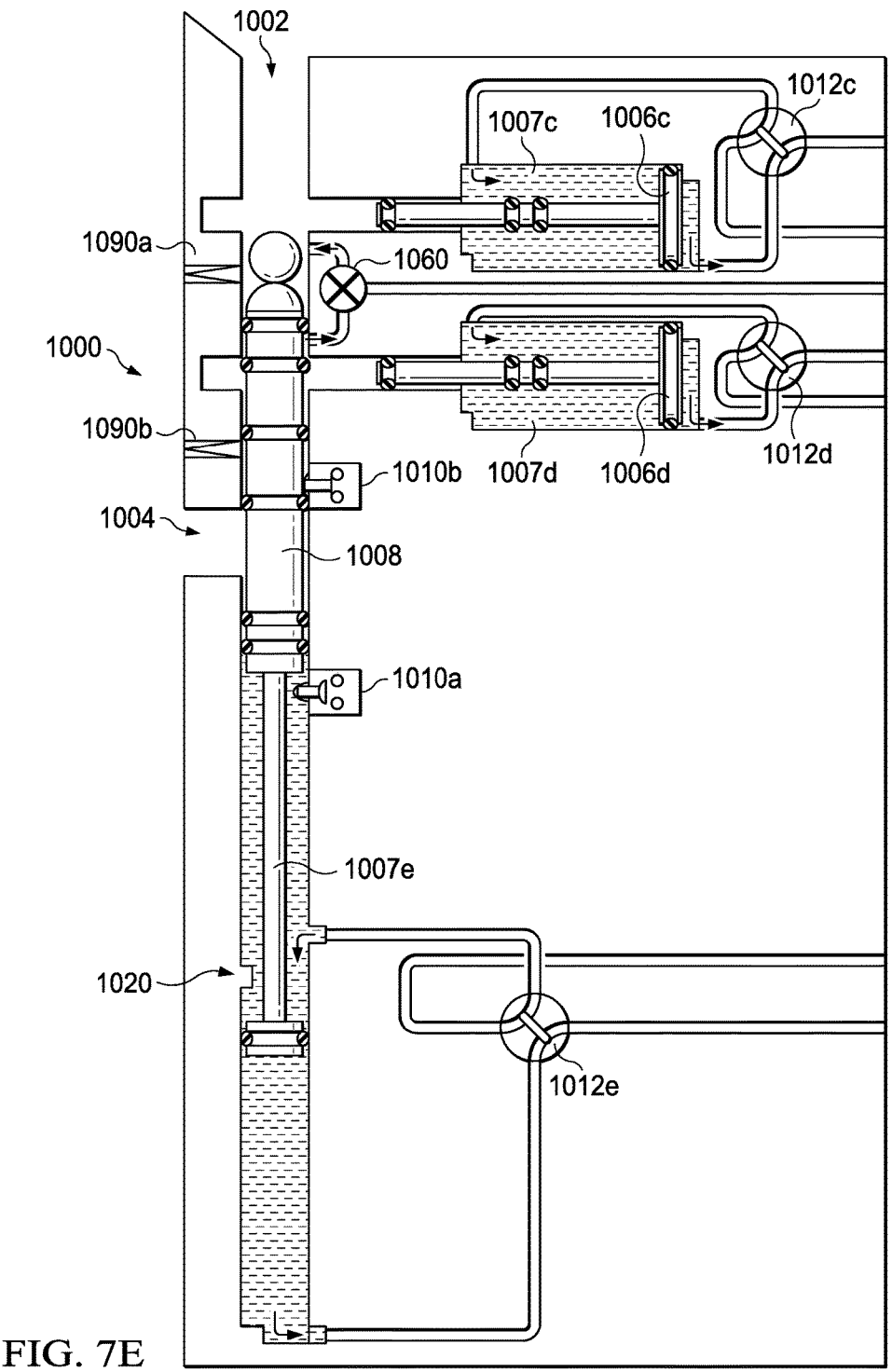

FIG. 7E shows a configuration in which the first switch 1010*a* is open and the second switch 1010*b* is closed, allowing the piston 1006*c* to be retracted into the piston chamber 1007*c*. As shown in FIG. 7E, the piston 1006*d* remains retracted inside its piston chamber 1007*d* in its right end-of-stroke position. Because both pistons 1006*c* and 1006*d* retract into their respective piston chambers 1007*c* and 1007*d*, the bead drops on to the piston head off the piston 1008.

Figure 7F:
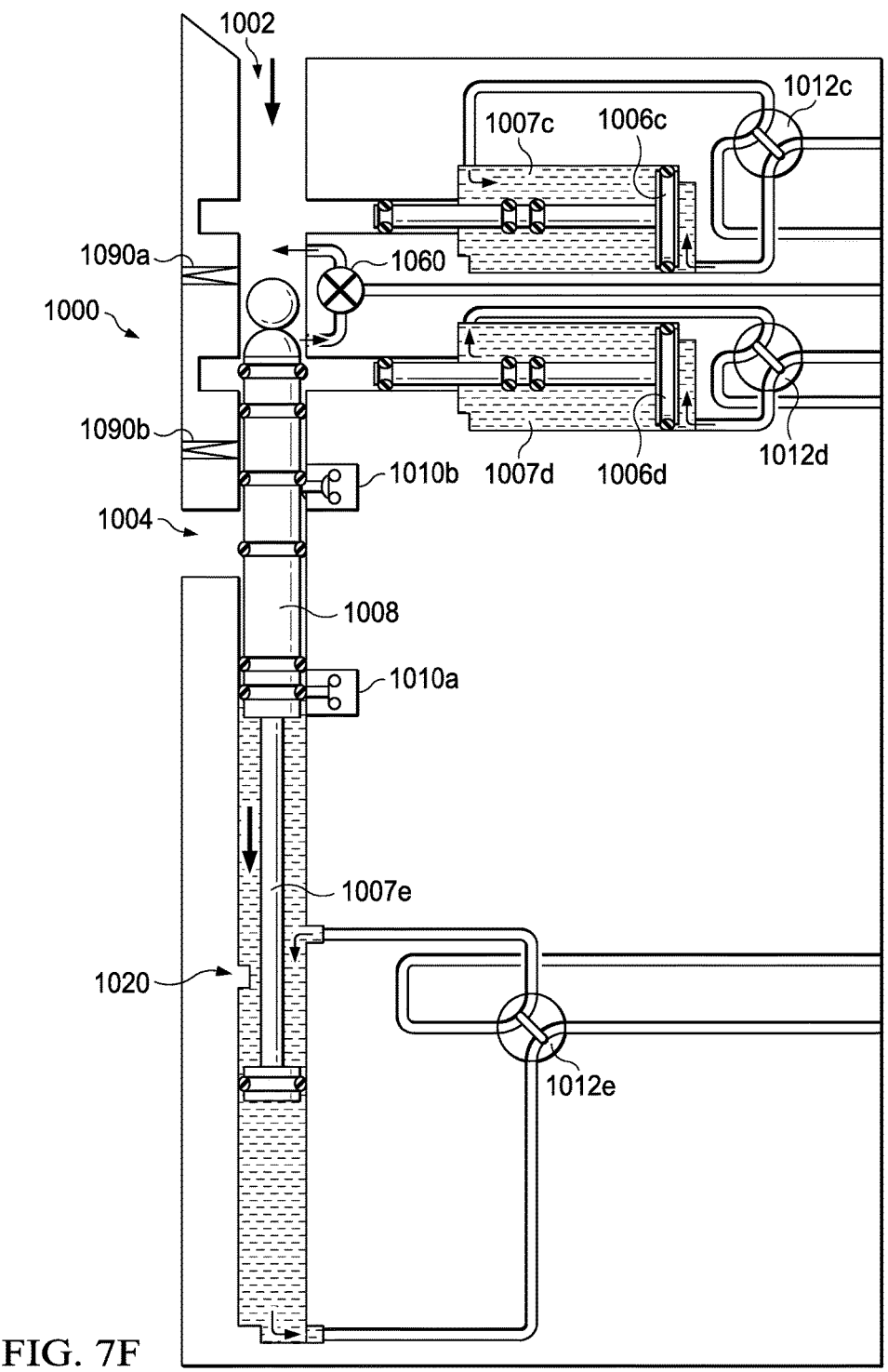

FIG. 7F shows a configuration in which the piston 1008 is traveling downward carrying the bead on its piston head. As the piston 1008 moves downward, the outer surface of the piston 1008 forces the switch 1010*a* into a closed position. In this configuration, both switches 1010*a* and 1010*b* are in their respective closed positions. When the switches 1010*a* and 1010*b* are in their closed positions, the hydraulic circuit controlling the piston 1006*c* operates the solenoid valve 1012*c* to extend the piston 1006*c* back to its left end-of-stroke position in which the piston 1006*c* extends across the bead travel path.

Figure 7G:
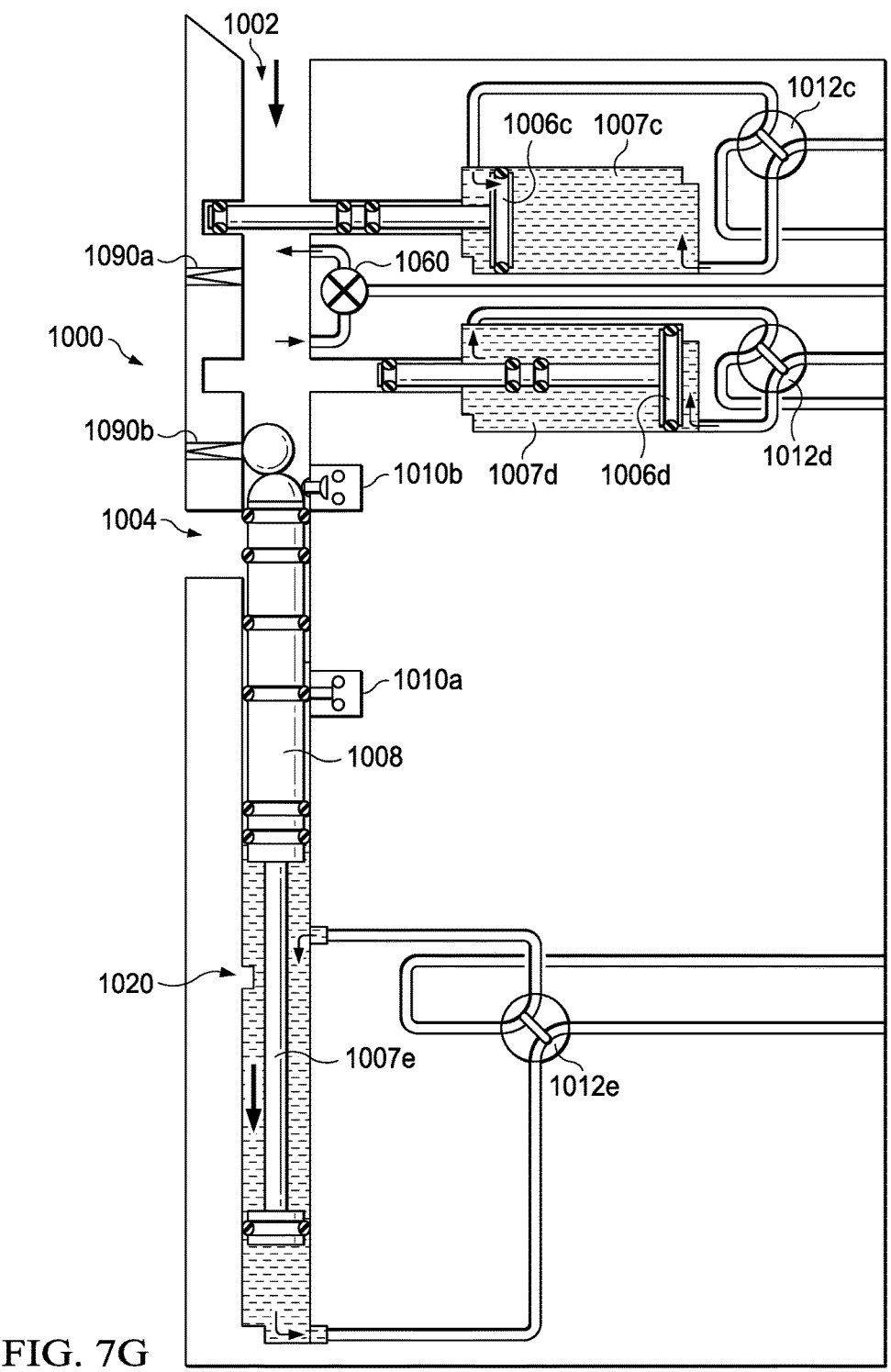

FIG. 7G shows a configuration in which the piston 1008 continues traveling downward carrying the bead on its piston head. Because the switch 1010*a* is in its closed position, the piston 1006*c* has been moved to its end-of-stroke position. As the head of the piston 1008 travels below the switch 1010*b*, the switch 1010*b* is released to its open position. In response, the hydraulic circuit controlling the piston 1006*d* operates the solenoid valve 1012*d* to extend the piston 1006*d* to its end-of-stroke position in which the piston 1006*d* extends across the bead travel path.

Figure 7H:
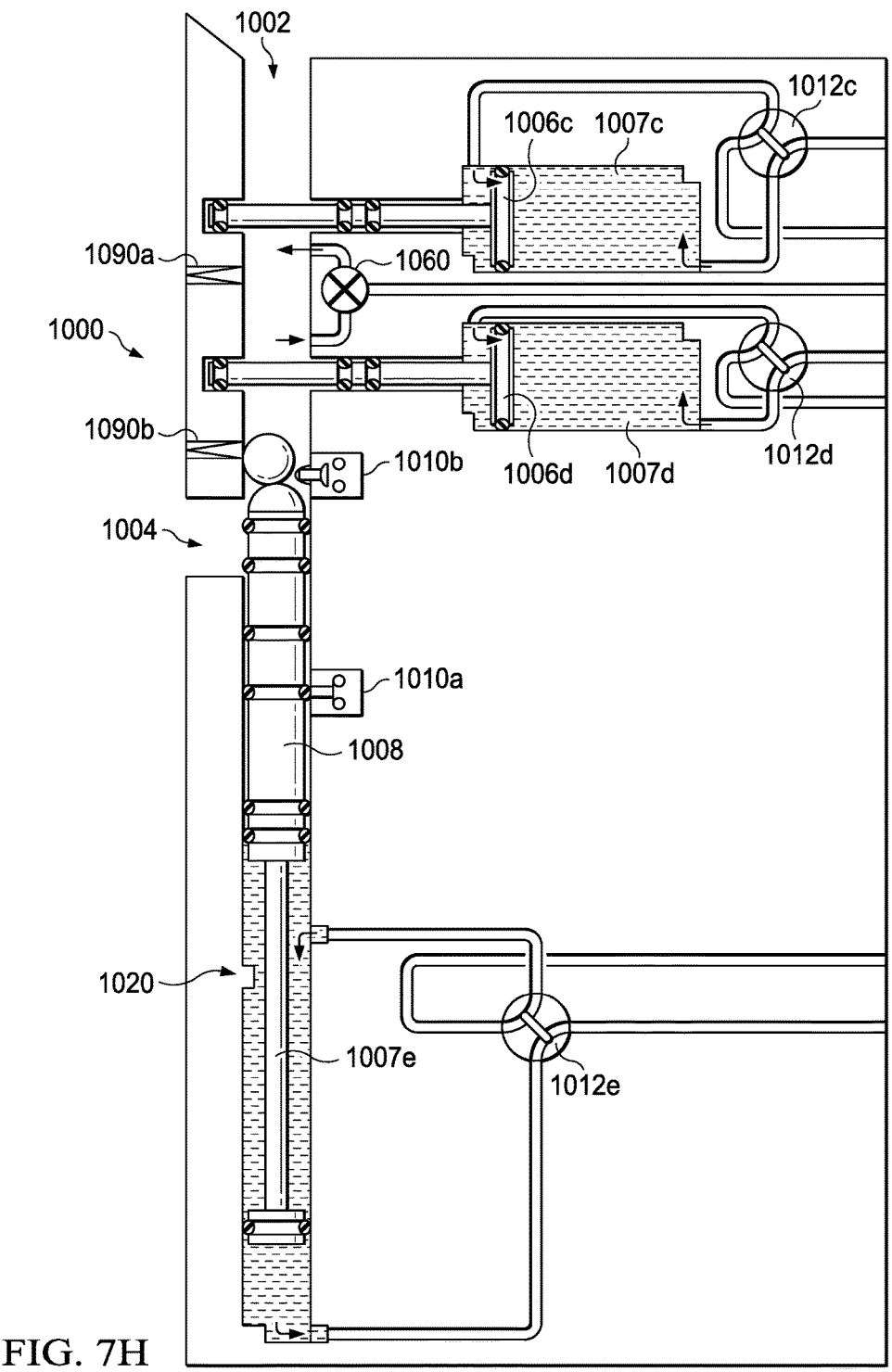
Figure 7I:
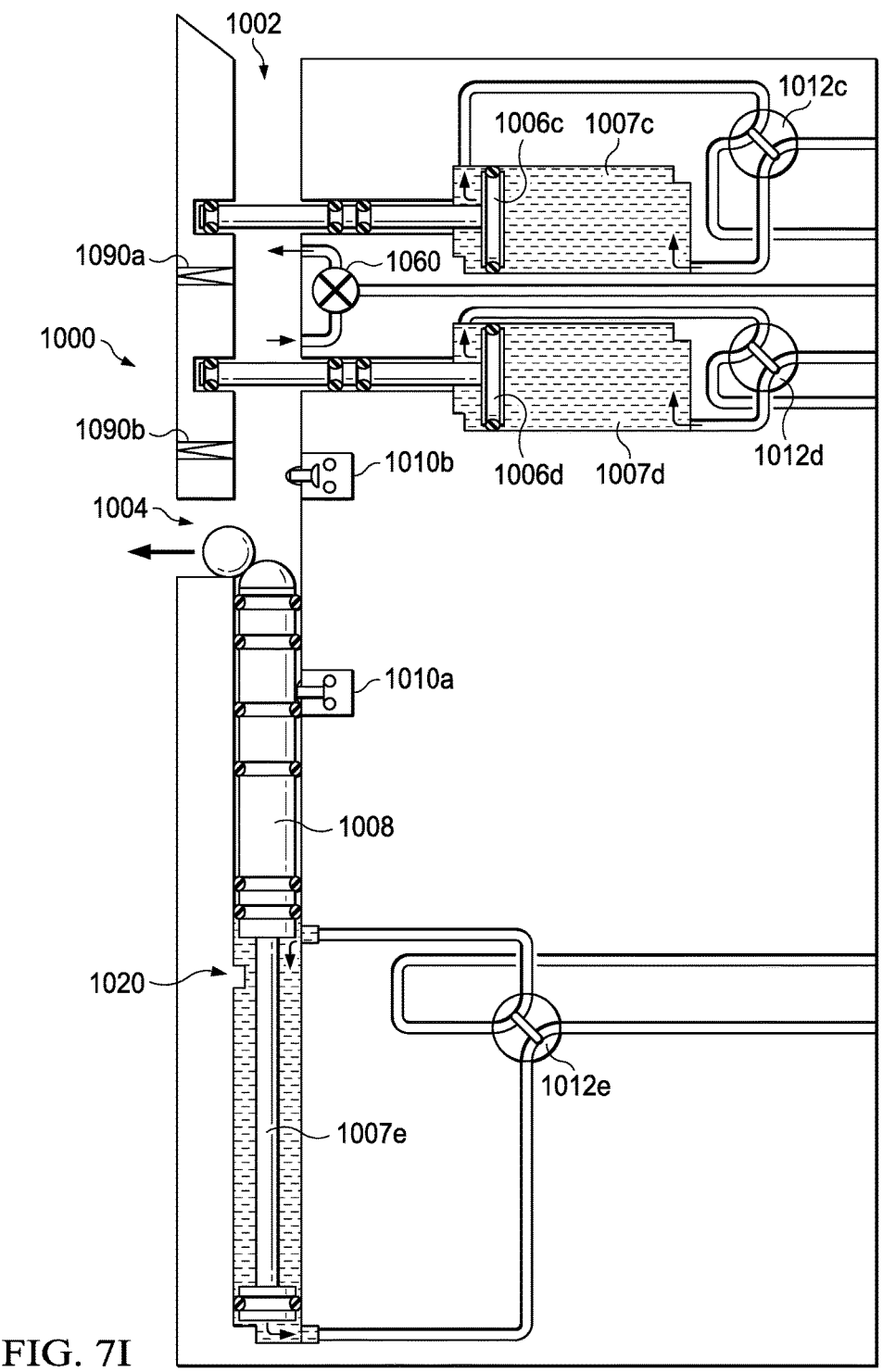
Figure 7J:
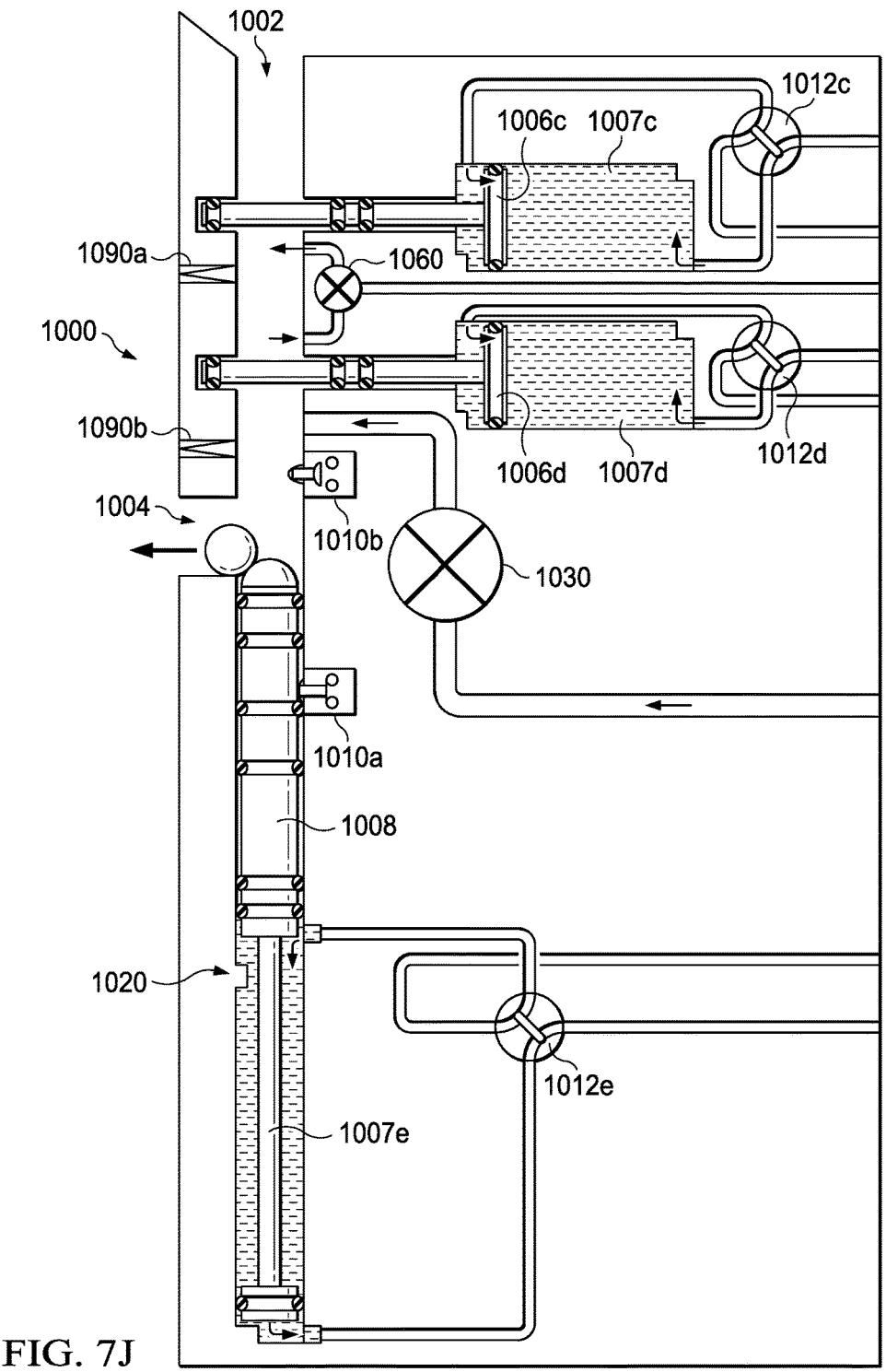

FIG. 7H shows a configuration in which the piston 1008 continues traveling downward and both the pistons 1006*c* and 1006*d* are in their respective end-of-stroke positions. FIG. 7I shows a configuration in which the piston 1008 has reached its bottommost position in which the piston head of the piston 1008 is substantially aligned with the outlet chamber 1004. The end of travel can also be indicated by a surge in electrical current of the circuitry that drives the pump motor when the bottom end of the piston reaches its full travel and the pump pressure increases significantly. In some implementations, the piston head of the piston 1008 can have a curvature or an inclined surface to force the bead out of the outlet chamber 1004. The steps described starting at FIG. 7A can be repeated to receive a new bead. In some implementations, an auxiliary pump 1030 (FIG. 7J) can be implemented to assist expelling the bead into the well. The auxiliary pump 1030 can flow well fluid through the bead travel path into the outlet chamber 1004. As shown in each of FIGS. 7A-7I, the borehole dispenser 1000 can include multiple unidirectional check valves (for example, a first check valve 1090*a* and a second check valve 1090*b*) on either side of each piston to allow fluids trapped in the bead path to be expelled into the borehole but to not let fluids from the borehole into the chamber during the piston travel events that cause a volume reduction.

Figure 8:
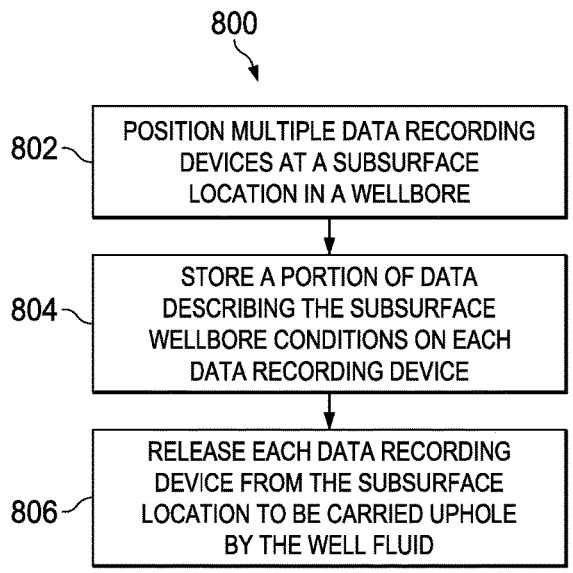
FIG. 8 is a flowchart of an example of a process of subsurface data transfer using well fluids.

FIG. 8 is a flowchart of an example of a process 800 of subsurface data transfer using well fluids. At 802, multiple data recording devices can be positioned at a subsurface location in a wellbore. A well fluid is flowing through the wellbore past the subsurface location to a surface of the wellbore. Each data recording device is configured to receive and store data describing subsurface wellbore conditions at or near the subsurface location. For example, each data recording device can be substantially similar to the data recording device 200 described above. At 804, at least a portion of the data describing the subsurface wellbore conditions can be stored on each data recording device. For example, one or more sensors positioned at or near the subsurface location can sense the data describing the subsurface wellbore conditions. The data sensed by one or more sensors can be recorded on the multiple data recording devices, each data recording device storing at least a portion of the data. At 806, each data recording device can be released from the subsurface location into the wellbore. The well fluid flowing past the subsurface location can carry each data recording device to the surface. For example, each data recording device can be released using a bead feeder mechanism, such as those described above, or a combination of the bead feeder mechanism and a borehole dispenser, such as those described above.

Figure 9:
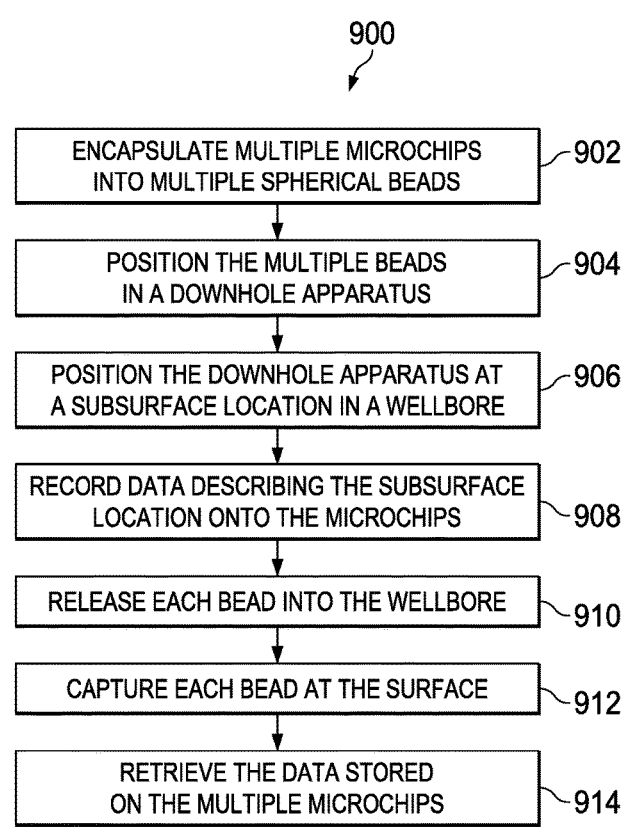
FIG. 9 is a flowchart of an example of a process of subsurface data transfer using well fluids.

FIG. 9 is a flowchart of an example of a process 900 of subsurface data transfer using well fluids. At 902, multiple microchips can be encapsulated into respective multiple substantially spherical beads. Each microchip is configured to record data. To encapsulate a microchip into a respective bead, the bead can be filled with bead filler material. The microchips can be embedded within the bead filler material. Two magnetic plates can be embedded on either side of the microchip within the bead filler material as part of a mechanism to enhance alignment between receiver and transmitter antennae in wireless programmer and bead. The bead can be sealed. At 904, the multiple beads can be positioned in a downhole apparatus. The apparatus can include a bead feeder mechanism in which the multiple beads can be stacked. The apparatus can include a wireless programming device configured to record data on to the multiple microchips, encapsulated in the multiple beads. The apparatus can include a borehole dispenser configured to receive a bead released by the bead feeder mechanism, and release the bead outside the downhole apparatus into the wellbore. At 906, the downhole apparatus with the multiple beads can be positioned at a subsurface location in a wellbore. A well fluid can be flowing through the wellbore, past the subsurface location, to a surface. At 908, data describing the subsurface location in the wellbore can be recorded onto the multiple microchips. For example, the wireless programming device can record the data onto the microchips. At 910, each bead encapsulating each microchip can be released, for example, one bead at a time. For example, the bead feeder mechanism can release each bead to the borehole dispenser. The borehole dispenser can release each bead into the wellbore. Alternatively, the bead feeder mechanism can release each bead directly into the wellbore. The beads released into the wellbore are carried to the surface by the well fluid. At 912, each bead can be captured at the surface. At 914, the data stored on the multiple microchips can be retrieved.

The circuitry or controllers or both described in this disclosure can be implemented as hardware, software, firmware, or combinations of them. Alternatively or in addition, the circuitry or the controllers or both can be implemented as electrical circuits. In another alternative, the circuitry or the controllers or both can be implemented as computer-readable media storing instructions executable by computer processors to perform the operations described here.

Thus, particular implementations of the subject matter have been described. Other implementations are within the scope of the following claims.

The invention claimed is:

1. A method comprising:
encapsulating each data recording device of a plurality of data recording devices in a respective bead, wherein encapsulating each data recording device in the respective bead comprises:
positioning two magnetic plates within the bead;
positioning the data recording device between the two magnetic plates at substantially a center of the bead;
filling the bead with bead filler material, and
encapsulating the bead filler material with a bead shell;
after encapsulating each data recording device of the plurality of data recording devices in the respective bead, positioning the plurality of data recording devices at a subsurface location in a wellbore, wherein when a well fluid flows through the wellbore past the subsurface location to a surface, each data recording device configured to receive and store data describing subsurface wellbore conditions at or near the subsurface location;
storing at least a portion of the data describing the subsurface wellbore conditions on each data recording device; and
releasing, from the subsurface location, each data recording device storing at least the portion of the data in a flow of the well fluid, wherein the well fluid flows each data recording device to the surface.

2. The method of claim 1, wherein encapsulating each data recording device in the bead results in a plurality of beads, each bead including an encapsulated data recording device, and wherein the method further comprises:
positioning the plurality of beads in a bead feeder mechanism configured to dispense beads;
positioning a programming device in the bead feeder mechanism, the programming device configured to store data on a data recording device encapsulated in a bead; and
operating the bead feeder mechanism and the programming device to store at least the portion of the data describing the subsurface wellbore conditions on each data recording device encapsulated in each bead.

3. The method of claim 2, wherein releasing, from the subsurface location, each data recording device storing at least the portion of the data in the flow of the well fluid comprises releasing each data recording device directly and without intervening components into the flow of the well fluid.

4. The method of claim 2, wherein from the subsurface location, each data recording device storing at least the portion of the data in the flow of the well fluid comprises releasing each data recording device into a borehole dispenser configured to receive a bead from the bead feeder mechanism and to transfer the bead to the well fluid.

5. The method of claim 4, further comprising hydraulically isolating the bead feeder mechanism from the well fluid using the borehole dispenser.

6. The method of claim 1, further comprising:
capturing, at the surface, the plurality of data recording devices; and
retrieving at least the portion of the data describing the subsurface wellbore conditions from each data recording device.

7. A system comprising:
a plurality of data recording devices, each configured to be stored at a subsurface location in a wellbore, each data recording device configured to receive and store data describing subsurface wellbore conditions at or near the subsurface location past which well fluid flows to a surface of the wellbore;
a plurality of beads, each bead encapsulating a respective data recording device, each bead configured to be stored at the subsurface location in the wellbore, wherein each bead comprises:
a bead shell;
bead filler material substantially filling the bead shell;
the microchip embedded in the bead filler material; and
two magnetic plates positioned on either side of the microchip and embedded in the bead filler material;
a bead feeder mechanism configured to be positioned at the subsurface location, the bead feeder mechanism configured to store the plurality of beads and to dispense one bead at a time; and
a wireless programming device configured to be positioned at the subsurface location, the wireless programming device configured to receive a bead of the plurality of beads from the bead feeder mechanism, and to record at least a portion of the data describing the subsurface wellbore conditions onto a data recording device encapsulated in the bead,
wherein the bead feeder mechanism is configured to release the bead encapsulating the data recording device on which the at least the portion of the data describing the subsurface wellbore conditions is stored into a flow of the well fluid towards the surface.

8. The system of claim 7, further comprising a borehole dispenser connected to the bead feeder mechanism, the borehole dispenser configured to receive the bead released by the bead feeder mechanism and to transfer the bead to the well fluid.

9. The system of claim 8, wherein the borehole dispenser comprises:
an inlet chamber connected to an outlet of the bead feeder mechanism;
an outlet chamber connected to the wellbore; and
a piston configured to stroke between the inlet chamber and the outlet chamber, the piston configured to capture the bead released by the bead feeder mechanism at the inlet chamber, transport the bead from the inlet chamber to the outlet chamber and release the bead from the outlet chamber into the flow of the well fluid.

10. The system of claim 9, wherein the borehole dispenser further comprises:

a hydraulic fluid circuit connecting the piston to a low pressure reservoir and a high pressure reservoir through a solenoid valve; and
control circuitry connected to the hydraulic fluid circuit, the control circuitry configured to operate the solenoid valve to stroke the piston between the inlet chamber and the outlet chamber.

11. The system of claim 9, wherein the borehole dispenser further comprises a switch configured to switch between an open circuit position and a closed circuit position in response to being out of and in contact, respectively, with the piston, the switch connected to the bead feeder mechanism, wherein the bead feeder mechanism is configured to release the bead in response to the switch being in the closed circuit position.

12. The system of claim 7, wherein each data recording device comprises a microchip.

13. The system of claim 7, wherein the wireless programming device comprises:
a powering and recording coil configured to receive and transmit radio frequency waves to transmit and record data onto the microchip;
a base; and
two magnets arranged on the base to form a chamber to receive the bead, wherein the powering and recording coil and the two magnets are positioned on either side of the base.

14. The system of claim 7, wherein the bead feeder mechanism comprises a feeder tube configured to store the plurality of beads in a vertical stack, the feeder tube comprising an outlet that is aligned with the wireless programming device to release the bead encapsulating the data recording device to the wireless programming device.

15. A method comprising:
encapsulating a plurality of microchips into a respective plurality of substantially spherical beads, wherein encapsulating a microchip into a respective bead comprises:
filling the bead with bead filler material,
embedding the microchip within the bead filler material,
embedding two magnetic plates on either side of the microchip within the bead filler material, and
sealing the bead, wherein microchip is configured to record data;
positioning the plurality of beads in a downhole apparatus comprising:
a bead feeder mechanism in which the plurality of beads are stacked,
a wireless programming device configured to record data onto the plurality of microchips encapsulated in the plurality of beads, and
a borehole dispenser configured to receive a bead released by the bead feeder mechanism and release the bead outside the downhole apparatus;
positioning the downhole apparatus with the plurality of beads at a subsurface location in a wellbore, wherein a well fluid is flowing through the wellbore past the subsurface location to a surface;
operating the wireless programming device to record data describing the subsurface location in the wellbore onto the plurality of microchips;
operating the bead feeder mechanism to release each bead encapsulating each microchip storing at least a portion of the recorded data into the borehole dispenser; and
operating the borehole dispenser to release each bead into a flow of the well fluid flowing in the wellbore.

16. The method of claim 15, further comprising:
capturing, at the surface, the plurality of beads; and
retrieving the data describing the subsurface wellbore conditions from the plurality of microchips.

17. The method of claim 15, further comprising receiving the data describing the subsurface location from one or more sensors disposed at or near the subsurface location.

18. The method of claim 15, wherein a wellbore equipment is installed at or near the subsurface location, wherein the data describing the subsurface location comprises data describing operational parameters of the wellbore equipment operating at or near the subsurface location, and wherein the method further comprises receiving the data describing the operational parameters from the wellbore equipment.

* * * * *